(12) United States Patent
Van Hoorn

(10) Patent No.: US 12,525,324 B2
(45) Date of Patent: Jan. 13, 2026

(54) ACTIVE LEARNING USING COVERAGE SCORE

(71) Applicant: Recursion Pharmaceuticals, Inc., Salt Lake City, UT (US)

(72) Inventor: Willem Paul Van Hoorn, Oxford (GB)

(73) Assignee: Recursion Pharmaceuticals, Inc., Salt Lake City, UT (US)

(*) Notice: Subject to any disclaimer, the term of this patent is extended or adjusted under 35 U.S.C. 154(b) by 333 days.

(21) Appl. No.: 18/138,021

(22) Filed: Apr. 21, 2023

(65) Prior Publication Data

US 2023/0335228 A1    Oct. 19, 2023

Related U.S. Application Data

(63) Continuation of application No. PCT/GB2021/052753, filed on Oct. 22, 2021.

(30) Foreign Application Priority Data

Oct. 23, 2020 (GB) .................................... 2016884
Jul. 2, 2021 (GB) .................................... 2109633

(51) Int. Cl.
    *G16C 20/50* (2019.01)
    *G16C 20/70* (2019.01)

(52) U.S. Cl.
    CPC ............ *G16C 20/50* (2019.02); *G16C 20/70* (2019.02)

(58) Field of Classification Search
    CPC ........ G16C 20/50; G16C 20/62; G16C 20/70; G16C 20/30; G16C 20/40; G16C 60/00;
    (Continued)

(56) References Cited

U.S. PATENT DOCUMENTS

| | | | | |
|---|---|---|---|---|
| 12,283,350 B2* | 4/2025 | Stojevic | ................. | G16B 40/20 |
| 2005/0278124 A1* | 12/2005 | Duffy | .................... | G16C 20/30 |
| | | | | 702/19 |
| 2018/0104644 A1* | 4/2018 | Cox, Jr. | ................. | B01D 53/78 |

FOREIGN PATENT DOCUMENTS

| | | | | |
|---|---|---|---|---|
| CA | 3126055 A1 * | 4/2018 | ............. | G16B 30/00 |
| CA | 3048246 A1 * | 7/2018 | ............. | G16B 20/00 |

(Continued)

OTHER PUBLICATIONS

J. Thomas Leonard et al., "On Selection of Training and Test Sets for the Development of Predictive QSAR Models", QSAR & Combinatorial Science, vol. 25, No. 3, Mar. 1, 2006, 17 pgs. (Year: 2006).*

(Continued)

*Primary Examiner* — Jeffrey P Aiello
(74) *Attorney, Agent, or Firm* — Keller Preece PLLC

(57) ABSTRACT

A method for computational drug design includes defining a population of a plurality of compounds. Each compound includes one or more molecular properties. The method includes defining a training set of compounds from the population for which one or more biological properties are known. The method includes selecting, from the population, a subset of one or more compounds that are not in the training set. The method includes determining a subset score of the selected subset based on molecular properties of the one or more compounds in the selected subset, and evaluating the selected subset based on the determined subset score. The subset score is determined based on a frequency of the molecular properties in the population and on a frequency of the molecular properties in a sampled set comprising the training set and the selected subset.

20 Claims, 10 Drawing Sheets

(58) Field of Classification Search
CPC ........ G16B 15/00; G16B 15/30; G16B 25/10;
G16B 40/20; B01J 2219/007; B01J
2219/00689; B01J 19/0046; G01N
33/6803; G01N 33/15; G01N 2500/00;
G01N 2500/04; G01N 30/8693; G01N
2030/8813; G06N 3/047; G06N 3/08;
G06N 3/0455; G06N 3/042; G06N 3/045;
G06N 3/084; G06N 3/02; G06N 3/096;
G06N 3/09; G06N 3/0464; G06N 20/00;
G06N 20/10; G06N 10/20
USPC ...... 435/7.1, 4, 6.13; 702/22, 27, 19, 30, 32,
702/31, 23, 181; 703/11, 2, 12; 706/45,
706/12, 25
See application file for complete search history.

(56) References Cited

FOREIGN PATENT DOCUMENTS

| WO | WO 2012/112534 A2 | 8/2012 | |
|---|---|---|---|
| WO | WO 2019/186195 A2 | 10/2019 | |
| WO | WO-2019186193 A2 * | 10/2019 | ............. G16C 20/70 |

OTHER PUBLICATIONS

Exscientia Limited, GB Search Report, GB2016884.5, Apr. 1, 2021, 4 pgs.
Exscientia Limited, International Search Report and Written Opinion, PCT/GB2021/052753, Feb. 28, 2022, 16 pgs.
Exscientia AI Limited, International Preliminary Report on Patentability, PCT/GB2021/052753, Apr. 13, 2023, 8 pgs.
J. Thomas Leonard et al., "On Selection of Training and Test Sets for the Development of Predictive QSAR Models", QSAR & Combinatorial Science, vol. 25, No. 3, Mar. 1, 2006, 17 pgs.
Lutz Weber, "Current Status of Virtual Combinatorial Library Design", QSAR & Combinatorial Science, vol. 24, No. 7, Sep. 19, 2005, pp. 809-823.
Peter Willett, "Dissimilarity-Based Algorithms for Selecting Structurally Diverse Sets of Compounds", White Rose Research Online, Universities of Leeds, Sheffield and York, Journal of Computational Biology, 6 (304)(1999), 21 pgs.
Stephen D. Pickett et al., "Automated Lead Optimization of MMP-12 Inhibitors Using a Genetic Algorithm", ACS Medicinal Chemistry Letters, 2010 American Chemical Society, 6 pgs.
Notice of Reasons for Refusal as received in Japanese application No. 2023-549140 dated Sep. 8, 2025.

* cited by examiner

| Aspirin | ![aspirin structure] | | | | |
|---|---|---|---|---|---|
| ECFP_2 features | | | | | |
| | -1074141656 | -1100000244 | 734603939 | -1059365320 | 642810091 | -182236392 |
| | -1884411803 | 2099970318 | -473922720 | 866218936 | 1311676480 | 1408998974 |
| | 1996767644 | 1997021792 | 1337040050 | 1429461619 | 2025485523 | |

FIG. 1

| ECFP_4 | Shannon score | # in set | # selected |
|---|---|---|---|
| -1939757055 | 0.69315 | 300 | 4 |
| 2029508750 | 0.69315 | 300 | 4 |
| 2026249478 | 0.69315 | 300 | 3 |
| -196050067 | 0.69315 | 300 | 3 |
| 657586427 | 0.69315 | 300 | 3 |
| 655739385 | 0.69092 | 320 | 4 |
| 200746375 | 0.69092 | 320 | 3 |
| -1331920947 | 0.68593 | 264 | 4 |
| 1215378785 | 0.68593 | 264 | 2 |
| -154530762 | 0.68423 | 340 | 4 |
| -1672647522 | 0.67301 | 360 | 4 |
| -1660340418 | 0.67301 | 240 | 4 |
| 734603939 | 0.66241 | 226 | 4 |
| 1559650422 | 0.64745 | 210 | 2 |
| 203547503 | 0.63651 | 200 | 3 |
| -786013480 | 0.63651 | 200 | 2 |
| -167460056 | 0.63179 | 404 | 5 |

FIG. 4

ACTIVE LEARNING USING COVERAGE SCORE

RELATED APPLICATIONS

This application is a continuation of PCT Patent Application No. PCT/GB2021/052753, filed on Oct. 22, 2021, entitled "Drug Optimisation by Active Learning," which claims priority to (i) U.K. Patent Application No. GB2016884.5, filed on Oct. 23, 2020, entitled "Drug Optimisation by Active Learning" and (ii) U.K. Patent Application No. GB2109633.4, filed on Jul. 2, 2021, entitled "Drug Optimisation by Active Learning," each of which is incorporated by reference herein in its entirety.

FIELD OF THE INVENTION

The invention relates to methods and systems for the computational design of compounds, such as drugs. In particular, the invention relates to methods for the optimization of computational models through active learning, to be used in the design of drugs that interact with selected target molecules, and to the drugs designed using these system and methods.

BACKGROUND

Drug discovery is the process of identifying candidate compounds for progression to the next stage of drug development, e.g., pre-clinical trials. Such candidate compounds are required to satisfy certain criteria for further development. Modern drug discovery involves the identification and optimization of initial screening 'hit' compounds. In particular, such compounds need to be optimized relative to required criteria, which can include the optimization of a number of different properties. The properties to be optimized can include, for instance: efficacy/potency against a desired target; selectivity against non-desired targets; low probability of toxicity; and good drug metabolism and pharmacokinetic properties (ADME). Only compounds satisfying the specified requirements become candidate compounds that can continue to the drug development process.

The drug discovery process can involve making/synthesizing a significant number of compounds during the optimization from initial screening hits to candidate compounds. In particular, those compounds that are synthesized are measured to determine their properties, such as biological activity. However, the number of compounds that could be made as part of a particular drug discovery project will far outnumber—likely by orders of magnitude—the number of compounds that can be synthesized and tested. The results of the measurements of synthesized compounds are therefore analyzed and used to inform a decision on which compounds to synthesize next to maximize the likelihood of obtaining compounds with further improved properties relative to the various criteria required by a candidate compound.

The synthesis and subsequent measurement of biological activity of one or more compounds at a particular stage is referred to as a design cycle (or iteration) of the drug discovery process. Typically, a set of compounds is synthesized and tested at each design cycle of the process as this is more efficient than synthesizing and testing a single compound at a time. However, a level of available resources usually means that there is an upper limit on the number of compounds in a set that can be synthesized at any given design cycle.

During a drug discovery project, many hundreds or even thousands of compounds typically are synthesized across several design cycles before a candidate compound is found. This is a lengthy, expensive, and inefficient process: synthesis of a single compound can cost thousands of pounds, and it can take three to five years on average to obtain a single candidate compound.

The use of computational methods greatly increases the level of analysis that may be performed on already-synthesized compounds relative to that which could be performed by a medicinal chemist alone. In particular, machine learning (ML), artificial intelligence (AI), or other mathematical methods can be used to evaluate numerous design parameters in parallel, at a level that is beyond the capabilities of a human, to identify relationships between parameters and desired properties, such as biological activity levels. The mathematical methods can then use these identified relationships to make a better prediction as to which compounds are more likely to exhibit a greater number/level of desired properties relative to required criteria of a candidate compound. This means that such mathematical methods can be used to reduce the number of design cycles, and so reduce the number of compounds that need to be synthesized, to obtain a compound that achieves a desired combination of properties, as required of a candidate compound, thereby achieving an associated reduction in cost and time of a drug discovery project.

Only those compounds that have already been synthesized and tested can be used to train a ML model that is designed to predict which compounds are most likely to exhibit the desired properties, e.g., highest biological activity. The prediction of which compounds would be best to synthesize in the next design cycle to optimize desired properties is therefore only as accurate as the data—i.e., previously-synthesized compounds—that is available to train the ML model. In particular, a ML model will only (be likely to) make accurate predictions if: there are a sufficient number of compounds in the set used to train the ML model; and the compounds in this training set are sufficiently representative of the pool of compounds from which compounds to synthesize are to be selected.

As mentioned above, the chemical space of compounds that can be made in any given drug discovery project may be vast. In order not to waste resources, it is therefore important that the compounds that will be most effective in improving the ML model are selected for synthesis so that they will be part of the training set for the next design cycle, meaning that a better ML model is available for the subsequent iteration. Again, computational methods can be used to suggest which compounds to add to the training set in order to provide the biggest improvement in the predictive ability of the ML model. Such computational methods can provide greater levels of improvement in a ML model, either when used alone or in conjunction with the expertise of a medicinal chemist, relative to when relying on the expertise of the medicinal chemist alone. However, prior art methods for selecting the best data points to be added to a training set may not be optimal for drug discovery projects. One reason for this may be because chemical space—unlike other physical or theoretical spaces—is not equally spaced, and so metrics based on such assumptions may be less effective.

It is against this background to which the present invention is set.

SUMMARY OF THE INVENTION

The invention relates generally to a computational method and system for the design and automatic selection of compounds in a chemical space to optimize training of a ML model, where ultimately the trained model can be used to design and automatically select with greater accuracy compounds that are optimized relative to required criteria.

According to an aspect of the present invention there is provided a method for computational drug design. The method comprises defining a population of a plurality of compounds, each compound having one or more molecular properties. The method comprises defining a training set of compounds from the population for which one or more biological properties are known. The method comprises selecting a subset of one or more compounds from the population that are not in the training set. The method comprises determining a subset score of the selected subset in dependence on molecular properties of the one or more compounds in the selected subset, and evaluating the selected subset based on the determined subset score. The subset score is determined in dependence on a frequency of said molecular properties in the population and on a frequency of said molecular properties in a sampled set comprising the training set and the selected subset.

The determination step may comprise determining a compound score for each of the one or more compounds of the selected subset in dependence on one or more molecular properties of said compound, and wherein the subset score is determined based on the determined compound score of each compound in the selected subset.

The subset score may be determined to be a sum of the respective compound scores of the compounds in the selected subset.

Determining the compound score of one of the compounds in the selected subset may comprise determining a molecular property score of each of the one or more molecular properties of the compound in dependence on the frequency of the respective molecular property in the population and on the frequency of the respective molecular property in the sampled set, the compound score of said compound being based on the determined scores of the one or more molecular properties of said compound.

The compound score of said compound may be determined to be a sum of the determined molecular property scores of the one or more molecular properties of said compound.

The molecular property score of each of the one or more molecular properties may be determined in dependence on a normalized probability of said molecular property being in the sampled set, the normalized probability being determined in dependence on the frequency of said molecular property in the population and in the sampled set.

The normalized probability may be determined in dependence on a number of compounds in the sampled set relative to a number of compounds in the population.

The normalized probability may be a Laplacian corrected normalized probability.

The Laplacian corrected normalized probability $P_{corr}$ may be given by $$P_{corr} = \frac{F_{sampled} + 1}{F_{set} + 1/P_{base}}$$

where $F_{sampled}$ is the frequency of said molecular property in the sampled set, $F_{set}$ is the frequency of said molecular property in the population, and $P_{base}$ is the number of compounds in the sampled set divided by the number of compounds in the population.

The molecular property score of each of the one or more molecular properties may be determined in dependence on a number of compounds in the sampled set in which said molecular property is present relative to a number of compounds in the sampled set.

The molecular property score may be determined in dependence on a normalized Shannon entropy value of said molecular property in the sampled set.

The normalized Shannon entropy value may be given by $$SC = \frac{-f\ln(f) - (1-f)\ln(1-f)}{\ln(2)}$$

where f is the number of compounds in the sampled set in which said molecular property is present divided by the number of compounds in the sampled set.

The molecular property score $Cov_{final}$ may be given by $$Cov_{final} = \begin{cases} Cov * SC, & Cov \geq 0 \\ Cov * (2 - SC), & Cov < 0 \text{ and } f > 0.5 \end{cases}$$

where $$Cov = -\ln(P_{corr}/P_{base})$$

The subset may include a prescribed number of compounds.

The method may comprise defining the number of compounds to be selected in the subset.

The evaluation step may comprise determining whether the subset score satisfies a prescribed condition.

The prescribed condition may be that the subset score is greater than a prescribed minimum threshold score.

If the prescribed condition is satisfied, then the method may comprise synthesizing at least some of the compounds in the selected subset to determine one or more biological properties of said compounds.

The method may comprise adding the synthesized compounds to the training set.

The selected subset may be an initial selected subset, and the method may comprise: selecting a second subset, different from the initial selected subset, including one or more compounds from the population not in the training set; and, determining the subset score of the selected second subset, and evaluating the selected second subset based on the determined score.

The steps of selecting the second subset and determining its score may be performed if the prescribed condition is not satisfied.

Selecting the second subset may comprise substituting one or more compounds in the initial selected subset with one or more new compounds from the population that are not in the training set.

The method may comprise identifying the one or more compounds from the initial selected subset to be substituted based on the respective determined compound scores of the one or more compounds in the initial selected subset.

The one or more compounds in the initial selected subset having the lowest determined compound scores may be identified for substitution.

The method may comprise iteratively performing the steps of: selecting a new subset, different from a subset selected in a previous iteration, including one or more compounds from the population which are not in the training set; and determining the subset score of the selected new subset, and evaluating the selected new subset based on the determined score, until a stop condition is satisfied.

The stop condition may include at least one of: a maximum number of iterations have been performed; the subset score of the subset selected at one of the iterations satisfies the prescribed condition; and the difference between the respective subset scores of the selected subsets at successive iterations is less than a prescribed difference threshold.

The method may comprise synthesizing the compounds of the selected subset at the iteration at which the stop condition is satisfied to determine one or more biological properties of said compounds.

The method may comprise selecting a plurality of new subsets at each iteration, identifying one of the plurality of selected subsets at the iteration at which the stop condition is satisfied based on the determined subset scores of the respective plurality of selected subsets, and synthesizing the compounds of said one identified subset to determine one or more biological properties of said compounds.

The identified subset may be the subset having the highest subset score in the plurality of subsets at the iteration at which the stop condition is satisfied.

The selected subset may be a first subset, and the method may comprise: selecting a plurality of subsets each including a plurality of compounds from the population which are not in the training set; determining the subset score of each of the subsets; and selecting the first subset from the plurality of subsets based on the determined subset scores of the respective subsets.

The first subset may be selected to be the subset having the highest subset score in the plurality of subsets.

The plurality of subsets may each have the same number of compounds.

The evaluation step may comprise evaluating the selected subset based on an activity score of the selected subset obtained from an activity model for predicting activity levels of the compounds in the population.

The evaluation step may comprise evaluating the selected subset based on the determined subset score and the activity score relative to a desired balance of said scores.

The plurality of new subsets may each comprise a different balance between the determined score and the activity score.

The plurality of new subsets may form a Pareto front of determined subset and activity scores at the iteration at which the stop condition is satisfied.

The training set may be initially empty.

The molecular properties of each of the plurality of compounds in the population may include structural features of the compounds.

The structural features of each of the plurality of compounds in the population may correspond to fragments present in said compound.

The fragments present in each of the plurality of compounds may be represented as a molecular fingerprint.

The molecular fingerprint may be an Extended Connectivity Fingerprint (ECFP), optionally ECFP0, ECFP2, ECFP4, ECFP6, ECFP8, ECFP10 or ECFP12.

The molecular properties of each of the plurality of compounds in the population may include chemical properties of the compounds.

The molecular properties of each of the plurality of compounds in the population may include structural features and chemical properties of the compounds.

The chemical properties may correspond to types of interaction exhibited when the respective compound binds to a predetermined target molecule.

The chemical properties of at least some of the compounds in the population may correspond to a prediction of the types of interaction exhibited when the respective compound binds to the predetermined target molecule.

The prediction may comprise a prediction of which of one or more predetermined types of interaction is exhibited when the respective compound binds to the predetermined target molecule.

The method may comprise obtaining the prediction of the types of interaction exhibited when the respective compound binds to the predetermined target molecule.

Obtaining the prediction for each compound may comprise generating a three-dimensional representation of said compound; and, performing a docking process, using the generated three-dimensional representation, to predict a preferred docking pose when said compound binds to the predetermined target molecule, wherein the exhibited types of interaction are predicted based on a result of the docking process.

The types of interaction exhibited when the respective compound binds to the predetermined target molecule may be represented as an interaction fingerprint. Optionally, the interaction fingerprint is a protein-ligand interaction fingerprint (PLIF).

The types of interaction may include one or more of: an H-bond interaction; a weak H-bond interaction; an ionic interaction; a hydrophobic interaction; a face-to-face aromatic interaction; an edge-to-face aromatic interaction; a $\pi$-cation interaction; and a metal complexation interaction.

Each of the compounds in the population may be ligands and the predetermined target molecule is a protein.

The molecular properties of each of the plurality of compounds in the population may include physical properties of the compounds.

The one or more biological properties may include one or more of: activity; selectivity; toxicity; absorption; distribution; metabolism; and excretion.

One or more of the biological properties may be defined relative to respective desired biological properties.

The method may comprise defining a machine learning model for approximating one or more biological properties of compounds in the population as a function of the one or more molecular properties of said compounds; and training the machine learning model using the training set of compounds.

The method may comprise performing the training step each time one or more compounds are added to the training set.

The machine learning model may be at least one of: a Bayesian optimization model; a regression model; a clustering model; a decision tree model; a random forest model; and a neural network model.

The method may comprise executing the machine learning model, after the training step, to predict one or more compounds in the population having one or more desired biological properties.

The method may further comprise synthesizing at least one of the one or more predicted compounds.

The one or more predicted compound may be a candidate drug or therapeutic molecule having a desired biological, biochemical, physiological and/or pharmacological activity against a predetermined target molecule.

The predetermined target molecule may be an in vitro and/or in vivo therapeutic, diagnostic or experimental assay target.

The candidate drug or therapeutic molecule may be for use in medicine; for example, in a method for the treatment of an animal, such as a human or non-human animal.

According to another aspect of the present invention there is provided a compound identified by the method described above.

According to another aspect of the present invention there is provided a non-transitory, computer-readable storage medium storing instructions thereon that when executed by a computer processor causes the computer processor to perform the method described above.

According to another aspect of the present invention there is provided a computing device for computational drug design. The computing device comprises an input arranged (e.g., an input component configured) to receive data indicative of a population of a plurality of compounds, each compound having one or more molecular properties, and to receive data indicative of a training set of compounds from the population for which one or more biological properties are known. The computing device includes a processor arranged (e.g., configured) to select a subset of one or more compounds from the population which are not in the training set, to determine a subset score of the selected subset in dependence on molecular properties of the one or more compounds in the selected subset, and to evaluate the selected subset based on the determined subset score. The computing device includes an output arranged (e.g., an output component configured) to output a result of the evaluation. The subset score is determined in dependence on a frequency of said molecular properties in the population and on a frequency of said molecular properties in a sampled set comprising the training set and the selected subset.

The processor may be configured to perform a method as described above.

BRIEF DESCRIPTION OF THE DRAWINGS

Examples of the invention will now be described with reference to the following drawings.

FIG. 1 schematically illustrates the ECFP2 fingerprint of an aspirin molecule.

FIG. 4 lists structural features of compounds in an example set of compounds in order of Shannon entropy score.

DETAILED DESCRIPTION

Figure 2:
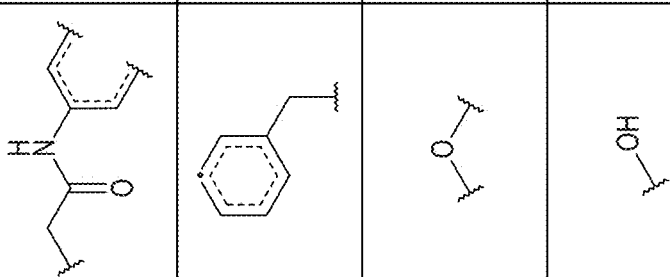
FIG. 2 is a table indicating Shannon entropy scores of structural features present in at least some compounds in an example set of compounds.

Molecular or drug design can be considered a multi-dimensional optimization problem that uses the hypothesis generation and experimentation cycle to advance knowledge. Each compound design can be considered a hypothesis which is falsified in experimentation. The experimental results are represented as structure-activity relationships, which construct a landscape of hypotheses as to which chemical structure is likely to contain the desired characteristics. The process of drug design is also an optimization problem as each project starts out with a product profile—i.e., target function—of desired, specified attributes. However, even though the objective can be accurately described, it has previously been an expensive and difficult challenge to find an optimal solution. One particular difficulty with this type of problem is to effectively construct the landscape of hypotheses across the vast space of feasible solutions from a relatively limited knowledge base of experimental results.

The drug discovery process is typically performed in iterations known as design cycles. At each iteration a set of molecules or compounds is synthesized, and their biological properties are measured. The activities are analyzed, and a new set of compounds is proposed, based on what has been learned from previous iterations. This process is repeated until a clinical candidate is found. As well as activity, the measured biological properties can include one or more of selectivity, toxicity, affinity, absorption, distribution, metabolism, and excretion.

At any particular stage of the process, a set of compounds will have been synthesized or made, with their biological activity being known. An aim of the process is to find one or more optimal compounds from a large population or pool of compounds that could be synthesized, but for which there are only resources and/or time to synthesize a subset of compounds from the population.

An automated or computational drug design process uses a mathematical model, e.g., a machine learning (ML) model, to predict or hypothesize which compounds in the population of compounds that could be made are optimal compounds, e.g., those compounds that maximize biological activity. The ML model is trained using the available structure-activity relationships from experimental results, i.e., from those compounds in the population that have already been synthesized and tested. The strategy or approach of using an ML model to select for synthesis those compounds with the highest predicted activity from the population of possible compounds is referred to as 'exploitation'. An exploitation strategy may be regarded as a use phase of the process.

This approach will only be successful if the predictive capability of the ML model is sufficiently accurate, i.e., if the ML model is sufficiently well trained. Each compound from the population that is synthesized and tested is added to a training set of compounds that is used to train the ML model. The number of molecules or compounds that are added to the training set at a particular iteration is typically constrained by resource. That is, the number of compounds in the subset of compounds that is synthesized at each iteration will be defined at a prescribed maximum number.

The predictive capability of the ML model will be sufficiently accurate only if there is a sufficient number of compounds in the training set. As such, a certain number of iterations or design cycles may need to be performed—in which the prescribed maximum number of compounds are added to the training set at each iteration, for instance—before the ML model is sufficiently trained.

Also, the predictive capability of the ML model will be sufficiently accurate only if the compounds in the training set are sufficiently representative of the overall population of compounds that can be selected for synthesis. It is therefore important that, prior to the ML model being sufficiently well trained, compounds that will be most helpful in improving the ML model—i.e., those that will be most representative—are included in the subset to be synthesized at any given iteration. Selecting compounds for synthesis on this basis is referred to as 'exploration'. An exploration strategy may be regarded as a learning phase or training phase of the process.

Exploitation and exploration strategies therefore have competing needs when selecting a subset of compounds for synthesis at a particular iteration of a drug discovery process. Indeed, a choice as to which strategy is appropriate will likely change in dependence on the particular stage of the drug discovery process. For instance, at an early stage of a drug discovery project, it is less likely that a sufficiently well-trained model has yet been built. An exploration strategy at this stage may therefore be the most appropriate strategy as the reward of exploration is ultimately a better-trained, and therefore more accurate, model. An exploitation strategy would not make best use of limited resources at this stage as exploitation is not a particularly good strategy for increasing the representativeness of the training set. On the other hand, if the ML model is already sufficiently well-trained—for instance, at a later stage of a drug discovery project—exploitation would be the appropriate strategy in that case as the subset of compounds selected by the model for synthesis is more likely to be optimal compounds relative to desired characteristics, e.g., high biological activity levels. At this stage, an exploration strategy would not make best use of the limited resources as exploration is not an optimal strategy for selecting compounds that are likely to have desired characteristics.

As mentioned above, a ML model will only (be likely to) make accurate predictions if: there are a sufficient number of compounds in the set used to train the ML model and the compounds in this training set are sufficiently representative of the pool of compounds from which compounds to synthesize are to be selected. The first of these means that a certain number of design cycles may need to be performed to obtain a sufficient number of synthesized compounds (unless data relating to a sufficient number of previously-synthesized compounds is already available). The second of these means that, for initial design cycles in the early stages of a drug discovery project, it may not be desirable to base a decision on which compounds to include in a set to be synthesized (solely) using the designed ML model. This is because the ML model will predict which compounds are highly active according to a model which has not yet been trained to a sufficient level, meaning that the predictions will be less likely to be accurate. In addition, synthesizing compounds according to such a prediction will not be of use in improving the ML model for the subsequent design cycle, as the ML model prediction further focusses in on the relationships/information already identified from the training set of compounds. In particular, the ML model prediction does not assist in suggesting which compounds to synthesize with the aim of improving the ML model for the next design cycle.

In order to reduce the time and cost associated with a drug discovery project, the number of iterations or design cycles that is needed to discover a candidate or optimal compound having the desired properties should be minimized. It is therefore critical that a sufficiently well-trained model for predicting compounds having the desired properties can be built as quickly as possible, i.e., requiring as few compounds in the training set as possible. As such, it is important that the most representative compounds are selected for synthesis in the early stage of a project to minimize the number of iterations where (at least a degree) of exploration is needed, as a candidate compound is unlikely to emerge from iterations employing such a strategy.

Furthermore, each iteration of a drug discovery process may implement a combination of exploration and exploitation. That is, in a subset of compounds selected for synthesis at a given iteration, some of the compounds may be selected according to an exploration strategy and some of the compounds may be selected according to an exploitation strategy. For instance, the number of compounds selected for the subset according to an exploration strategy may reduce as the number of iterations that have been performed increases, as the accuracy of the ML model will likely increase with each successive iteration. In contrast, the number of compounds selected for the subset according to an exploitation strategy may increase as the number of iterations that have been performed increases.

The present invention is advantageous in that it provides an improved computational drug design method for selecting compounds for synthesis as part of an exploration strategy—optionally in combination with an exploitation strategy—such that the time and cost to train a ML model to a sufficient level is reduced.

In accordance with the present invention, a first step of the computational drug design method is to define a population of a plurality of compounds or molecules. In particular, this population is the set of compounds that can be selected for synthesis during a particular drug discovery project. The population can be defined or acquired in any suitable manner, e.g., via known computational methods and/or with human input. For instance, the population may be a set of compounds obtained from a generative or evolutionary design algorithm. In particular, an evolutionary design algorithm may generate a number of novel compounds based on an initial set of one or more known compounds—e.g., an existing drug—that have at least some of the desired properties of an optimal compound for a particular project on which the present method is to be used. Alternatively, a number of novel compounds may be generated in any suitable manner. Those generated novel compounds having at least some desired features may be retained for further analysis. In one example, a starting group of compounds (including millions of compounds, for instance) may be reduced in number by adding known methods to keep certain ones of the compounds with at least some desired features for a particular project at hand. One or more filters may be applied to the retained compounds to remove any undesirable compounds. The filters can be defined according to any appropriate criteria for selecting (or filtering) desirable compounds from undesirable compounds. For instance, one useful filter may be adapted to remove duplicate compounds. Another filter may be adapted to remove compounds having a certain level of toxicity. The filtered set of compounds may then form the population from which selection for synthesis may be made.

The population may include any suitable number of compounds. Generally, the population will include more—and likely significantly more—compounds than a number of compounds that can be synthesized as part of the particular drug discovery project, e.g., for reasons of available resource. However, the population will also generally not include so many compounds such that computational analysis of the population according to the present invention is not feasible. For instance, the number of compounds in the population may typically be of the order of hundreds or thousands of compounds, but it will be understood that for any given project the population may be larger or smaller than this.

A next step of the computational drug design method is to define a training set of compounds from the population for which one or more biological properties are known. The training set is to be used to train a ML model for assessing structure-activity relationships for the particular drug discovery project. The training set includes those compounds from the population that have been synthesized and tested experimentally to determine one or more biological properties. As such, the number of compounds in the training set increases as a drug discovery project progresses, i.e., as more iterations or design cycles are performed. At the start of the drug design method, i.e., prior to any compounds in the population being tested, the training set may (initially) be empty, i.e., the training set may comprise zero compounds. Alternatively, the training set may include compounds for which biological properties are known a priori, e.g., compounds that have been previously tested as part of a different project, and which have at least some of the desired properties of an optimal compound according to the particular project under consideration.

A next step of the computational design method includes selecting a subset of at least one compound from the population, where the compounds in the subset are not in the training set. The number of compounds that is selected is based on the number of compounds that may be tested at any given iteration or design cycle of the drug design project in view of the resources that are available. The number of compounds to be selected in the subset, or at least an upper bound on that number, may therefore be predetermined. Generally, the method involves prescribing the number of compounds to be selected in the subset. The way in which the subset of one or more compounds is selected will be discussed in greater detail below. The size of the selected subset, i.e., the number of compounds in the selected subset, will likely be significantly less than the size of the population. For instance, the number of compounds in the selected subset may be at least one order of magnitude lower than the number of compounds in the population, and optionally more than at least one order of magnitude lower.

In its broadest sense, the computational design method of the present invention may be regarded as providing a method for selection of (a subset of) compounds according to an improved exploration strategy at a given iteration or design cycle of a drug design project, as will be described below. However, it will be understood that this can be combined with compound selection according to different strategies (e.g., different exploration strategies, or an exploitation strategy) at any given design cycle.

The exploration strategy of the present method is based on information theory. In particular, selection of compounds is to be based on which compounds will provide the maximum amount of information (about structure-activity relationships in the population, for instance) when tested. The amount or type of information that a compound, or subset of compounds, provides is determined based on features of the compounds.

Each compound in the population includes a number of structural features that combine to form its chemical structure. Such structural features can be represented in any suitable manner. For instance, one way in which to describe the structure of a compound or molecule is via fingerprinting. In particular, the fingerprint of a particular compound may be represented as mathematical objects—e.g., a series of bits or list of integer numbers—that reflect which particular structural features or substructures are present or absent in the compound.

There are several different classes of fingerprints, such as topological fingerprints, structural fingerprints, and circular fingerprints. A common circular fingerprinting method is Extended Connectivity Fingerprinting (ECFP). A number of ECFP methods are known, such as ECFP0, ECFP2, ECFP4 and ECFP6. As is known in the art, determining a fingerprint of a compound will generally include assigning each atom in a compound with an identifier, updating these identifiers based on adjacent atoms, removing duplicates, and then forming a vector from the list of identifiers.

Purely for illustrative purposes, an example of a molecule and its ECFP2 fingerprint features is shown in FIG. 1. In particular, the molecule chosen as an illustration is aspirin. It may be seen that the compound includes 17 fingerprint features, each representing a piece or part of the compound, with each feature being stored as a (positive or negative, integer) number.

The ML model to be built as part of a drug discovery project may associate structural features that may be present in compounds with desired properties (biological activities). For instance, in a project in which high activity against a target is desired, and a particular compound exhibits a high level of activity, an issue is in determining which feature(s) of that compound contributes to the high activity level. An aim of the method may then be to select compounds for testing that will maximize the amount of information that can be obtained in relation to the structure-activity relationships.

Shannon entropy (or 'information entropy', or simply 'entropy') in information theory is a measure of information content. In general, some questions are more informative than others when asking questions about a data set. Shannon entropy can be used to determine which are the best questions to ask in order to maximize the extracted information. The optimal (binary) questions to ask are those that will split the data set equally in two.

In the context of the present method, the entropy of individual features (e.g., fingerprint features) of compounds in a population may be determined. In particular, the entropy of a particular feature depends on how many compounds in the population the particular feature is present in. A feature that is present in half of the compounds in the population, but absent in the other half, will have the highest entropy value. On the other hand, a feature that is present in each of the compounds in a population, or is absent from each of the compounds in the population, will have the lowest entropy value (in fact, a zero value). By testing compounds having features with relatively high entropy values, it can more readily be deduced which features contribute to high activity levels, for instance.

The Shannon entropy H of a feature x in a population of compounds may be expressed as:

$$H(x) = -\Sigma_i p(x_i) \ln p(x_i)$$

where $p(x_i)$ is the probability of the different states of the feature in a compound of the population, i.e., present in the compound or absent from the compound.

As an illustrative example, consider a population having 2400 compounds. A first feature (e.g., fingerprint feature) is present in 1200 of the 2400 compounds. The Shannon entropy of this first feature may therefore be calculated as:

$$H = -\left(\frac{1}{2}\right)\ln\left(\frac{1}{2}\right) - \left(\frac{1}{2}\right)\ln\left(\frac{1}{2}\right) \cong 0.69.$$

A second feature is present in 500 of the 2400 compounds. The Shannon entropy of this second feature is therefore:

$$H = -\left(\frac{5}{24}\right)\ln\left(\frac{5}{24}\right) - \left(\frac{19}{24}\right)\ln\left(\frac{19}{24}\right) \cong 0.51.$$

It is seen that the Shannon entropy of the first feature is greater than that of the second feature. Indeed, as the first feature is present in precisely half of the compounds in the population, then the first feature provides maximal information content at a feature level.

The Shannon entropy of a feature in a population is therefore dependent on the frequency of the particular feature in the compounds of the population, i.e., the number of compounds in the population in which the particular feature is present. For instance, using the data set of 2500 compounds presented in Pickett et al., (2011) "Automated lead optimization of MMP-12 inhibitors using a genetic algorithm", *ACS Medicinal Chemistry Letters*, 2(1), 28-33, the Shannon entropy score or value of different features—represented as ECFP fingerprints—in the population is shown in FIG. 2. FIG. 2 indicates that the structural feature of an amide connected to an aromatic ring occurs relatively infrequently in the set or population, specifically in 50 of the 2500 compounds in the set. As such, this feature has a relatively low Shannon score of 0.098. At the other end of the scale, hydroxy (substructure of carboxylic acid) occurs very frequently in the set, and in fact is present in each of the 2500 compounds in the set, meaning that its Shannon score is 0. Of the features presented in FIG. 2, ether oxygen has the highest Shannon score as it comes closest to splitting the set of compounds equally into two in terms of whether the feature is present or not. That is, a feature having a frequency of 0.5 will be an optimal feature and will maximize the Shannon score.

Figure 3:
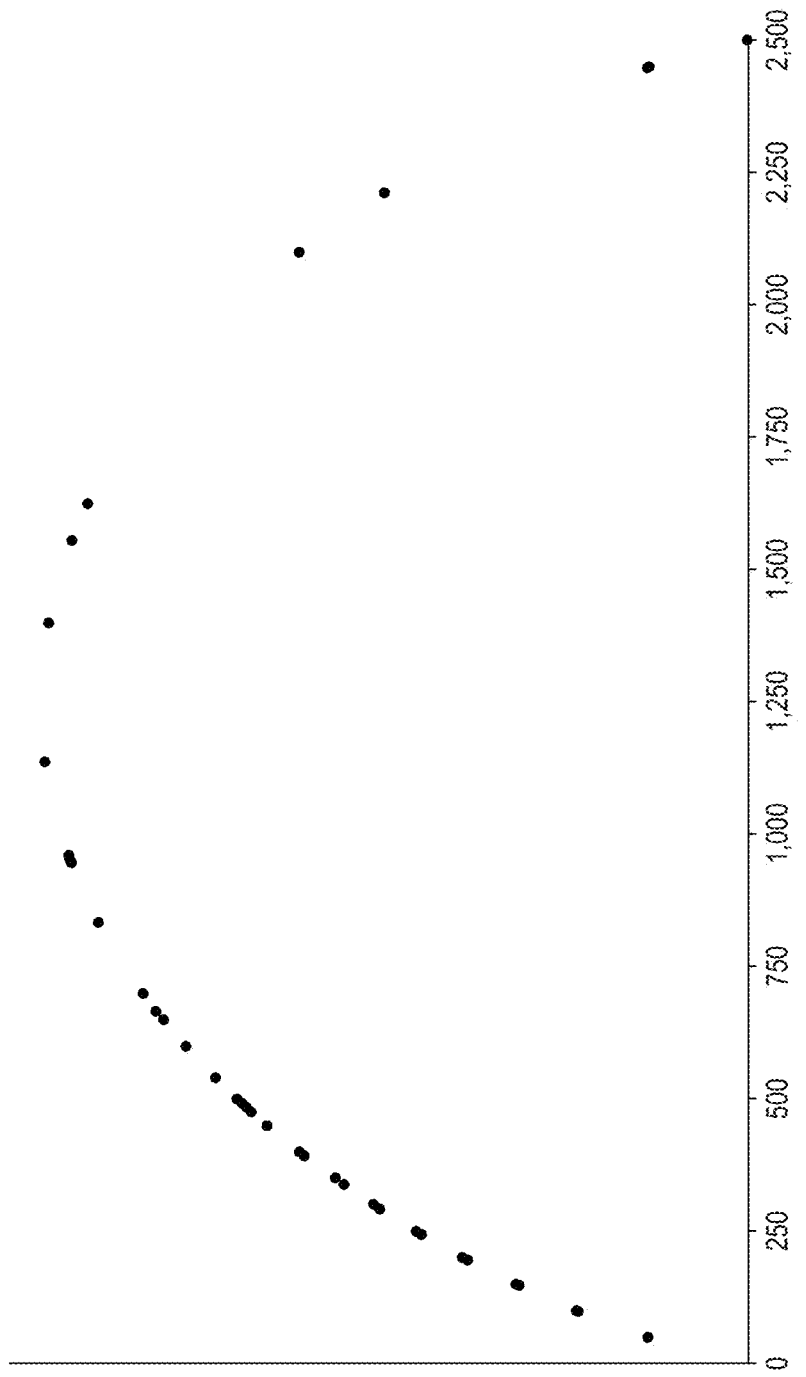
FIG. 3 shows a plot of Shannon entropy score against the frequency with which different structural features are present in the example set of compounds of FIG. 2.

A spread of the Shannon entropy scores of the ECFP6 features in the above-mentioned set of compounds presented in Pickett et al. is indicated in FIG. 3. In particular, it may be seen that those fingerprint features—represented by dots—present in approximately half of the compounds in the set have the highest Shannon entropy scores, while those features present in very few of the compounds or in almost all of the compounds have the lowest Shannon entropy scores. It is also seen that the majority of fingerprint features are present in fewer than half of the compounds in the set. Note that in FIG. 3 a single dot may represent more than one feature.

In an exploration strategy utilizing information theory, one option is to use Shannon entropy values of the features to select which compounds to test. In particular, a Shannon entropy of each compound in a population could be calculated based on the Shannon entropy values of the features in the compounds. For instance, the Shannon entropy of a compound may be the sum of the Shannon entropy values of the features that are present in said compound. However, the Shannon entropy values of the features in a compound may be combined in any suitable manner to obtain an entropy value for the compound. A first compound that is selected as part of a first iteration or design cycle according to an exploration strategy may therefore be selected to be the compound in the population having the highest Shannon score to maximize extracted information content. However, selection of subsequent compounds for testing (either as additional compounds to be tested in the same iteration, i.e., as part of the selected subset, or as compounds to be tested in subsequent iterations) using the same approach would not yield the same beneficial results. In particular, selection of a second compound by maximizing Shannon score could mean that the first and second compounds would be selected based on the same factors, i.e., the factors that led to the first compound having a high score could also be the same factors that led to the second compound having a high score. This may be regarded as asking similar questions more than once, thereby reducing the information content that would be extracted. What is needed, therefore, is a compound selection strategy that balances maximizing a Shannon entropy score on the one hand, and minimizing overlap of features present in selected compounds on the other.

An approach for providing a metric or measure to determine to what degree different features are 'under sampled' in the selection process is described in the following. An under sampled feature is a feature that balances a high Shannon entropy score with a low level of overlap with already-selected features. FIG. 4 illustrates an example in which a subset of five compounds have been selected from a set or population of compounds. In particular, FIG. 4 lists fingerprint features—in this case, ECFP4 features—in order of Shannon score, i.e., based on how many compounds in the set have a feature relative to the total number of compounds in the set. FIG. 4 also indicates in how many of the selected five compounds a feature is present. A score is defined that balances the Shannon score with the number of times a feature is sampled in the subset. However, a score based on a simple consideration of the ratio between the two would ignore some of the available information. For instance, with reference to FIG. 4, consideration of the ratio between the number of times a feature is sampled in the subset and the total number of compounds in which a feature is present ignores whether 2/200 or 3/300, for instance, is more significant in the present context.

Therefore, a metric may be defined that integrates both a ratio and significance into a score or measure. In particular, the defined metric is referred to as a 'coverage score' of a (fingerprint) feature in a population as it provides an indication of the coverage of information extracted about the feature across the chemical space of the population. In an exploration phase of a project, extracting information that has wide coverage across the population is beneficial in reducing the time or number of data points to sufficiently train the ML model describing or predicting structure-activity relationships, for instance.

Figure 5:
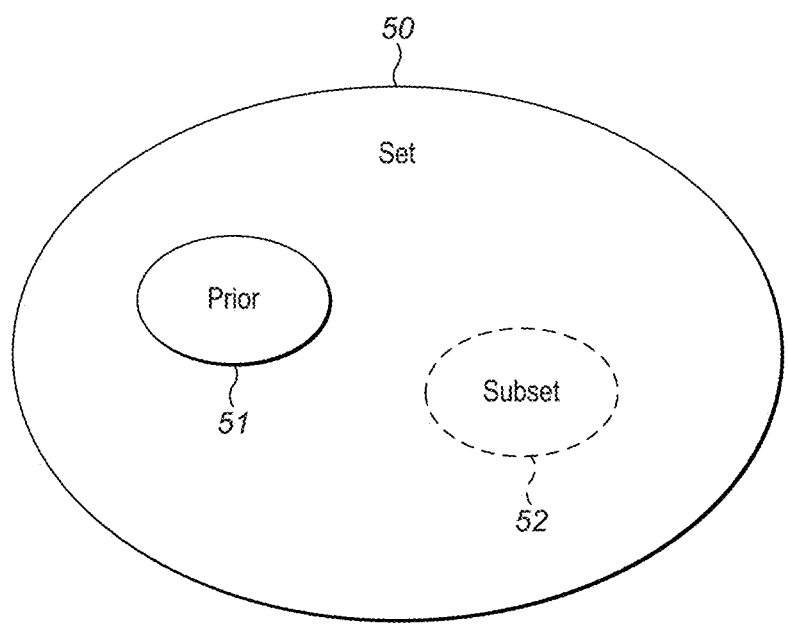
FIG. 5 schematically illustrates a relationship between a prior set of compounds and a selected subset of compounds in an example set or population of compounds.

The coverage score of a feature will be calculated (as outlined below), and this can then be used to calculate a coverage score of a particular compound and indeed a coverage score of a subset of compounds that have been selected (e.g., for testing) from a population of compounds. With reference to FIG. 5, in a given population or set 50 of compounds there exists a prior set or training set 51 of compounds that have already (previously) been selected and tested, e.g. in a previous iteration of the relevant drug discovery project, where the prior or training set 51 is separate from the subset 52 selected as part of the present iteration, i.e. the compounds in the selected subset 52 are different from the compounds in the prior or training set 51. The total number of sampled structures 51, 52 or compounds $N_{sampled}$ is then the sum of the prior set and the selected subset of compounds, i.e., $$N_{sampled} = N_{prior} + N_{subset}$$

where $N_{prior}$ is the number of compounds ($\geq 0$) that have already been selected prior to selecting the subset, for instance in a previous design cycle, and $N_{subset}$ is the size of the desired subset. The chance or probability $P_{base}$ of sampling a random compound from the set or population is then given by $$P_{base} = \frac{N_{sampled}}{N_{total}}$$

where $N_{total}$ is the number of compounds in the set or population.

The features (fingerprints) of each of the compounds in the set or population are determined and the frequency of occurrence of each feature i in each grouping is provided as follows: $F_{set,i}$ is the frequency of feature i in the (overall) set or population, i.e. the number of compounds in the set in which the feature i is present; $F_{prior,i}$ is the frequency of feature i in the prior or training (sub)set; $F_{subset,i}$ is the frequency of feature i in the (currently) selected subset; and, $F_{sampled,i} = F_{subset,i} + F_{prior,i}$ is the frequency of feature i in the so-called 'sampled set', which is the combination of the prior set and selected subset.

A (Laplacian corrected) normalized probability $P_{corr,i}$ of feature i in the sampled set may then be calculated as $$P_{corr,i} = \frac{F_{sampled,i} + 1}{P_{set,i} + 1/P_{base}}$$

An 'uncorrected' coverage score $Cov_i$ of a feature i may then be defined as $$Cov_i = -\ln(P_{corr,i}/P_{base})$$

In this way, a measure of the number of times a feature has been sampled relative to the number of times it is present in the set or population is provided. However, a correction needs to be applied to the uncorrected coverage score to also account for the information content that may be provided by different features. In this way, it is ensured that a feature is not 'over sampled' (in the group of sampled compounds). In particular, this correction is based on a Shannon entropy score of a feature i in the sampled group or set of compounds. The frequency or fraction of the feature i in the sampled group of compounds is $$f_i = \frac{F_{sampled,i}}{N_{sampled}}$$

A 'Shannon correction' $SC_i$ of the feature i (to its normalised probability) may then be given by $$SC_i = \frac{-f_i \ln(f_i) - (12 - f_i)\ln(1 - f_i)}{\ln(2)}$$

where the denominator normalizes the Shannon correction such that $0 < SC_i \leq 1$. Note that as the Shannon correction is dependent on the frequency with which a feature has been sampled, then the Shannon correction varies in dependence on (e.g., according to) the particular compounds in the prior set and selected subset (which will vary between iterations of a drug discovery project, for instance). This is different from the Shannon score described above for a feature in a population, which is constant as the particular compounds in the population remain the same throughout different iterations of a drug discovery project.

In some examples, the Shannon correction may be applied slightly differently depending on whether the uncorrected coverage score is greater or less than zero. In some examples, the final (corrected) coverage score $Cov_{final,i}$ for a feature i may therefore be defined as $$Cov_{final,i} = \begin{cases} Cov_i * SC_i, & Cov_i \geq 0 \\ Cov_i * (2 - SC_i), & Cov_i < 0 \text{ and } f_i > 0.5 \end{cases}$$

In some examples, the coverage score of a compound may then be calculated as the sum of the coverage scores of its features, and the coverage score of the selected subset may be calculated as the sum of the coverage scores of the compounds in the selected subset. As the (feature) coverage score of a feature is dependent on a frequency of the feature in the sampled set (which includes the selected subset and the prior set), then the (compound) coverage score of a compound in the selected subset is dependent on which other compounds (and, in particular, their features) are in the selected subset (as well as in the prior set). That is, if the selected subset includes a plurality of compounds, and one of those compounds is substituted for another compound from the population not in the prior set, then the (compound) coverage score of each compound in the (updated) selected subset needs to be re-calculated in order to then determine the (subset) coverage score of the (updated) selected subset.

If a feature becomes 'over sampled' in the sampled set, then its coverage score may decrease such that it becomes less likely that a compound in which that feature is present is selected to be in the subset. If one compound is selected (i.e., the selected subset includes one compound) the coverage scores of the features present in that compound change and may become negative. In this sense, the features present in the selected compound can now be regarded as 'over sampled' relative to other features present in compounds of the population, hence their coverage score decreases as selection of these features again (in preference to other features) may not be optimal for information content extraction in the context of structure-activity relationships. Selection of the first compound may have been performed in any suitable manner, for instance by highest coverage score—which, for selection of the first compound, may be equivalent to highest Shannon score across the population—where coverage score of the compound may be determined as the sum of coverage scores of its features.

Whereas the Shannon score of a compound at a population level is static or constant between iterations, the coverage score of a compound is dynamic or variable between iterations in dependence on the number of times each of its features have been sampled. Specifically, those compounds that have features which have been 'over sampled' relative to other features will have a lower coverage score, and so at each iteration compounds that maximize information gain, taking into account previously sampled compounds, can be selected.

After a number of compounds have been sampled, e.g., after a number of iterations of a drug discovery project or after testing of a selected subset having a plurality of compounds, many of the features having higher Shannon scores at a population level may have been sampled a number of times. As such, these features may tend to have lower coverage scores by this stage or iteration relative to features that have a lower Shannon score at a population level, but which may not have been sampled as frequently to this point. In particular, rarer features in the set or population—that is, features that are present in a relatively low number of compounds in the population—become more attractive, which may be reflected in relatively high coverage scores at this stage, meaning that compounds including those rarer features become more likely to be selected.

In its broadest sense, therefore, a step of the invention includes selecting a subset of one or more compounds from the population that have not previously been sampled—and so which are not in the training set of compounds for which biological activities are known—based on both: which compounds are in the population and which compounds are in a sampled set that includes the training set and the selected subset. More specifically, selection of a subset of one or more compounds (e.g., at a particular iteration) is based on a frequency with which structural features that are present in compounds of the subset appear in compounds of the population, and on a frequency with which those structural features appear in the sampled set. Expressed differently, selection of a subset of one or more (selected) compounds is dependent on a consideration of, for each of the structural features of the one or more selected compounds, the number of compounds in the population that include the respective structural feature and the number of compounds in the sampled set that include the respective structural feature. Generally, it may be the case that a compound whose features are present in a relatively high number of compounds in the sampled set becomes less likely to be selected.

As described above, one way in which a subset of compounds may be selected in dependence on the above considerations is that a score may be ascribed to the subset to quantify these considerations. In particular, the score may balance the frequency with which the features of the selected compound(s) are found in the population and the frequency with which the features of the selected compound(s) are found in the sampled set. In a case where a subset of compounds is selected with an aim of maximizing the (subset) coverage score of the subset, compounds that have structural features that are 'under sampled' in the sampled set relative to their prevalence in the population, but which would offer a relatively high level of information content (according to the Shannon correction defined above), will have a higher (compound) coverage score so that the chances that such compounds are retained in the selected subset are increased. The greater the number of compounds in the sampled set that particular structural features appear in, the more the score of compounds including those structural features may tend to be decreased. Although the score is described above as being calculated according to the above equations using normalized probability, it will be appreciated that this is simply one example of how a score may be determined that takes into account the presently-described factors and considerations, namely proportional sampling of features in a population while maximizing extracted information content, and that other equations or approaches could also be used.

According to steps of the invention, as the coverage score of a compound in the selected subset is dependent on the other compounds in the selected subset, the (subset) coverage score of the selected subset may be determined based on the (compound) coverage scores of the selected compounds in the subset. The selected subset is then evaluated in dependence on the determined subset coverage score. The subset score is determined in dependence on a frequency of the structural features of the compound(s) in the selected subset, in the population, and in the sampled set. The inventive method may include determining a (feature) coverage score of each of the one or more structural features—e.g., fingerprints—of the selected compound(s) in the subset in dependence on the frequency of the respective structural feature in the population and in the sampled set, where the (compound) coverage score of each selected compound may then be based on the determined scores of the one or more structural features of said selected compound. For instance, the score of each selected compound may be determined to be a sum of the determined scores of the one or more structural features of said selected compound. Optionally, the sum could be a weighted sum of the feature scores, for instance where the weights are based on the particular features and/or on the size (e.g., number of features) of a compound.

The evaluating step may include evaluating whether the selected subset of one or more compounds is suitable for a particular purpose, e.g., to be put forward for synthesis to determine the biological properties of the compounds in the subset, or whether a different subset of compounds is to be selected. For instance, the evaluation step may include determining whether the determined score—e.g., coverage score, as described above—of the selected subset satisfies a prescribed condition, for instance whether the score is greater than a prescribed minimum threshold score. If the prescribed condition is satisfied, or it is otherwise determined from the evaluating step to not select a different/updated subset of compounds, then the method may include synthesizing the selected compounds in the subset to determine one or more biological properties of said selected compounds. The one or more synthesized compounds may then be added to the training set.

In a case where the selected subset is an initial selected subset, the method may include selecting a second subset, different from the initial selected subset, from the population, where the compounds in the second subset are also not in the training set. The score of the selected second subset may then be determined in a corresponding manner to that of the first, initial subset (noting that the score of any compounds common to both the initial and second subsets will need to be re-calculated), and the selected second subset may then be evaluated. For instance, the evaluation may be to determine whether the prescribed condition is satisfied. As indicated above, the steps of selecting the second subset and determining its score may be performed only if the prescribed condition is not satisfied in respect of the initial subset. The initial subset may be selected at random from the population or may be selected using any suitable alternative method.

Selection of first (initial), second and subsequent subsets may be part of an iterative process to obtain a subset of compounds satisfying desired conditions, and which therefore may be suitable for synthesis at a particular iteration or design cycle of a drug discovery project. Such a method or process may include iteratively selecting and evaluating (based on their determined score) new subsets of one or more compounds until a stop condition is satisfied. Each selected new subset is different from a subset selected in a previous iteration, where the compounds in the selected new subset are from the population and are not in the training set. The stop condition may be any suitable condition such that further selection of new subsets is not to be performed. For instance, the stop condition could be that a maximum number of new subsets have been selected by the iterative process, i.e., a maximum number of iterations have been performed. Alternatively, the stop condition could be that the score of the subset selected at one of the iterations satisfies the prescribed condition. The stop condition could also be that the difference between the respective scores of the selected subsets at successive iterations is less than a prescribed difference threshold. The stop condition could include any combination of these example conditions, and/or include any other suitable conditions. The method may then include synthesizing some or all of the compounds in the selected subset at the iteration at which the stop condition is satisfied to determine one or more biological properties of said selected compound(s).

Generally, there may be a prescribed upper bound on the number of compounds that can be tested at an iteration or design cycle of a drug discovery process, which may inform the number of compounds to be included in the selected subset. The selection of the subset may be performed in any suitable manner. As part of an exploration strategy, it may be desired to select a subset having a high coverage score. However, it can be difficult to determine a subset that optimizes the coverage score across a population. This is because the coverage score of individual compounds in a subset is dependent on the other compounds in the subset, and also because of the vast number of different combinations of compounds that will generally be possible to form a subset from the population. Purely as an illustrative example, the subset may include around 10, 20 or 30 compounds; however, it will be understood that the subset can include any suitable number of compounds from the population. The number of unique subsets increases exponentially with increased subset size or increased population size, and so it may not always be possible to enumerate all possible subsets and pick the best (highest-scoring) one.

One option is to generate or select one or more initial subsets of compounds and then modify these by substituting one or more compounds in each with the aim of increasing their coverage score. For instance, if one or more initial subsets are selected, the evaluation step of the method may include determining whether the score of any of the selected subsets satisfy a prescribed condition. The prescribed condition could be that the score is greater than a prescribed minimum threshold score. If the prescribed condition is satisfied, then the method may include synthesizing the compounds in the selected subset satisfying the prescribed condition to determine one or more biological properties of said compounds. The synthesized compounds may then be added to the training set. This process may be performed by using a genetic algorithm, which is a good way of finding near optimal solutions when a full scan of all options is not possible or feasible.

If the prescribed condition is not satisfied by the one or more initially-selected subsets then one or more second subsets may be selected and checked to see if they satisfy the prescribed condition. Indeed, one or more subsets may be generated in an iterative manner until a desired subset is obtained. In particular, a plurality of subsets may be generated initially (in parallel), for instance at random or using an evolutionary or genetic algorithm. It will be understood that any suitable number of subsets may be generated, for instance less than 100, less than 50, or less than 10. The coverage score of each of these generated subsets may then be determined, and one or more of the subsets having the highest determined scores may then be iterated on to try to further increase their scores. Note that a particular compound can be included in more than one of the plurality of subsets at this stage. Also note that, as the coverage score of a compound in a subset is dependent on the other compounds in the subset, when one or more compounds are being substituted in a subset during the iterative process to maximize coverage score of the subset, the coverage score of the remaining compounds in the subset will change at each iteration and so will need to be re-calculated at each iteration in order to determine the score of the subset. That is, if a high-scoring compound is selected in the subset, its score will decrease if similar compounds are added to the training set or subset (i.e., sampled set) as similar compounds will have features in common and those features are thus sampled more, resulting in a reduced value. As such, it may therefore not be the case that simply replacing one compound in a subset with another compound having a higher coverage score will necessarily increase the overall coverage score of the subset. It is therefore the score of the subset that needs to be optimized rather than that of individual compounds. A genetic algorithm may for instance be used to optimize the subset in this way.

Such iteration of the subsets may be performed in any suitable manner. For instance, one or more compounds in a subset may be replaced or substituted with one or more new compounds from the population that are not in the training set. In one example, the method may include identifying one or more compounds from the initial selected subset to be substituted based on the respective determined scores of the plurality of compounds in the initial selected subset. Optionally, the one or more compounds in the initial selected subset having the lowest determined scores are identified for substitution.

At a given design cycle of a drug discovery project, the subsets may be iterated until a stop condition is satisfied, where the stop condition could be one of the conditions mentioned above. In the case where a plurality of subsets are generated at each iteration when maximizing coverage score, the method may include identifying one of the plurality of selected subsets at the iteration at which the stop condition is satisfied based on the determined scores of the respective plurality of selected subsets. The identified subset of compounds may then be put forward for synthesis. The identified subset may be chosen to be the subset having the highest score in the plurality of subsets at the iteration at which the stop condition is satisfied.

The above describes obtaining a subset of compounds in which coverage score is optimized, i.e., a purely explorative strategy. It is, however, possible to blend a degree of exploitation into the subset selection. To do this, an activity model is defined in which the activity of compounds is predicted. For instance, a Bayesian model or regression model may be used for this purpose. The activity of a compound may be defined with reference to the half maximal inhibitory concentration (IC50). For instance, a compound may simply be classed as active or inactive depending on whether its IC50 value is above or below a threshold activity level. Alternatively, a prescribed number of compounds from the set having the highest IC50 values can be classed as active, with the rest being inactive. An activity score of the selected subsets based on the activity scores of each compound in each subset from the activity model, e.g., a Bayesian model score, is then balanced against (subset) coverage score of the selected subsets to obtain a subset that balances exploration and exploitation in a desired combination. Again, an evolutionary or genetic algorithm may be used to optimize the subsets according to a desired blend of exploration and exploitation. In particular, in a case in which a plurality of subsets are being generated in parallel, each individual subset can be optimized at a given design cycle according to a different balance of exploration and exploitation. After sufficient iterations of the evolutionary or genetic algorithm at the given design cycle, a Pareto front of optimized subsets will emerge, ranging from a subset with highest explorative weighting to a subset with a highest exploitative weighting. A particular subset having a desired balance of exploitation—higher model score at the expense of coverage score—and exploration—higher coverage score at the expense of model score—can then be selected as desired, e.g. for synthesis.

The training set of compounds is used to train a machine learning (ML) model that is to be used to predict or determine compounds in the population that are more likely to exhibit desired properties relative to a target. In particular, the invention may include defining such a machine learning model for approximating one or more biological properties of compounds in the population as a function of the one or more structural features of those compounds. The ML model may be a Bayesian optimization model, a regression model, a clustering model, a decision tree model, a random forest model, a neural network model, or any other suitable type of ML model. The ML model may then be trained using the training set of compounds. At each iteration or design cycle of a drug discovery project the number of compounds in the training set will increase. The training stage of the ML model may be performed each time one or more compounds are added to the training set. As the number of compounds in the training set increases, a better-trained model may be obtained, i.e., a model that may be capable of more accurately predicting which compounds have the desired properties required by the particular project, e.g., high activity levels. Specifically, when at least some of the compounds being added to the training set used to train the ML model have been selected using the exploration methods described above, a ML model that is trained in less time and/or provides predictions of greater accuracy is obtained. The ML model may be executed to predict one or more compounds in the population having one or more desired biological properties. The ML model may be executed after each design cycle or iteration, or may be executed only after the model is trained to a certain level. Note that, at a particular design cycle of a project, one or more compounds that are to be synthesized and tested at the given iteration may be selected by the ML model as part of an exploitation strategy. For instance, at an earlier stage of a project, i.e., when relatively few iterations have been performed, only some of a subset of compounds selected for synthesis may be selected using the ML model as the model may not be particularly well trained at this point, with the remainder of the subset being chosen by an exploration strategy as described above in order to improve the ML model. However, at a later stage of the project once the ML model has been trained to a better level, a majority of, or all of, the compounds in a subset for synthesis may be selected by the ML model. These compounds may then be synthesized to provide candidate drug compounds having the desired biological, physiological or pharmacological activity.

Figure 6:
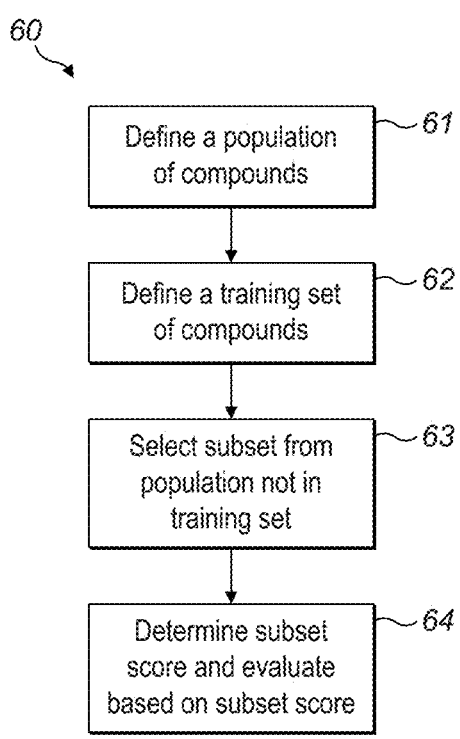
FIG. 6 summarizes the steps of a method in accordance with the present invention.

FIG. 6 summarizes the steps of a computational drug design method 60 in accordance with the invention. At step 61, a population 50 of a plurality of compounds is defined, where each compound has one or more structural features, e.g., described as fingerprint features. At step 62, a training set 51 of compounds from the population 50 is defined, where one or more biological properties of the compounds in the training set 51 are known. At step 63, a subset 52 of one or more compounds is selected from the population 50, where the one or more compounds in the subset 52 are not already in the training set. At step 64, a coverage score of the selected subset 52 is determined in dependence on structural features of the one or more compounds in the selected subset 52, and the selected subset 52 is evaluated or analyzed based on the determined subset score. The subset score is determined in dependence on a frequency of each structural feature in the population 50 and on a frequency of each structural feature in a sampled set 51, 52 comprising the training set 51 and the selected subset 52. The selection and evaluation of subsets of compounds may be part of an iterative process, for instance until a predetermined condition is satisfied, e.g., the selected subset has a sufficiently high score.

The method of the invention may be implemented on any suitable computing device, for instance by one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the method, and the processor(s) may execute the stored instructions to perform the method.

Many modifications may be made to the above-described examples without departing from the spirit and scope of the invention as defined herein with particular reference to the appended clauses and claims.

Examples of the invention are advantageous in that they provide a more efficient method for identifying compounds or molecules that are optimized against a target as part of a drug discovery project. In particular, the invention provides an improved technique for identifying the most representative molecules in a population or set, and which therefore are optimal for training a machine learning model that is to be used to predict one or more molecules in the population that exhibit the specific desired properties of a particular project. The invention advantageously uses information theory to select molecules that have structural features that will provide the greatest amount of information about a population of molecules. By focusing on molecules that have features that are not 'over sampled' relative to their prevalence in the population, but which provide a relatively high level of information content, for instance, it becomes easier to determine whether particular features contribute to, or are associated with, one or more desired properties exhibited by certain molecules. Examples of the invention can therefore advantageously be regarded as a trade-off between maximizing information or Shannon entropy of a subset of molecules with how often features of those molecules have already been selected/tested, i.e., do not ask the same question repeatedly, and with how many features each molecule has, i.e., do not ask too many questions at the same time. That is, the invention provides an approach for identifying which features of molecules are important, but then not sampling those features too much as this is equivalent to asking the same (good) question more than once. Use of the approaches described by the invention can therefore advantageously reduce the number of iterations or design cycles needed to obtain a clinical candidate molecule, thereby saving time and/or cost. The methods of the invention may also reduce the number of compounds that must be selected, synthesized, and tested in order to generate a training set and arrive at one or more suitable clinical candidate. In this way, the methods of the invention use active learning or machine learning to optimize drugs.

Unlike some other approaches for implementing exploration strategies, the invention does not rely on clustering 'similar' molecules in (unequal) chemical space in order to try to select a diverse range of molecules based on some distance metric. Instead, the invention advantageously provides a metric for optimizing the coverage of information provided by a selected subset of molecules, i.e., it provides a mechanism for identifying the best questions to ask. Whereas some clustering approaches will pick outliers from a population, examples of the present invention will focus on testing differences within chemical series. The invention is also advantageous in that the described approach is applicable to any population or group of molecules, allows for variable R Groups, and is not restricted to modifying molecules while retaining a static core, for instance, which can be the case for other known approaches.

In the above description, a metric (i.e., the 'coverage score') is defined that provides an indication of the coverage of information extracted about a structural feature (fragment) across the chemical space of a population of compounds. In an exploration phase of a project, extracting information that has wide coverage across the population is beneficial in reducing the time or number of data points to sufficiently train the ML model describing or predicting structure-activity relationships, for instance. In different examples of the invention, it may be desired to obtain an indication of the coverage of information extracted about features or parameters of the population of compounds other than the structural features of the compounds. The above examples focus on the application of a coverage score metric to structural features (fragments) present in a population; however, the coverage score metric may alternatively or additionally be applied to other molecular properties such as chemical or physical properties of compounds in the population. In particular, a coverage score metric may be used in association with a variety of different molecular properties of the compounds in the population in order to build better ML models for describing relationships that may exist between such molecular properties and the activities of compounds in a population with said molecular properties.

In one example, it may be desired to determine coverage information regarding the types of interactions that the compounds in the population exhibit—or are expected/predicted to exhibit—when the compounds bind or otherwise interact with a target molecule. In a corresponding manner to the above-described examples in which sampling too many compounds in the population having the same structural feature(s) is undesirable during an exploration phase of a project, in this example sampling too many compounds in the population that make the same interactions with a target molecule is undesirable during an exploration phase of a project. Sampling compounds exhibiting a broad range of binding interactions may be beneficial in reducing the time or number of data points to sufficiently train an ML model that describes or predicts interaction-activity relationships, for instance.

In order to apply the above-described coverage score approach to a particular molecular property of a population, the molecular property may need to be represented in an appropriate form for analysis. In the above-described examples, the structural features of the compounds in a population are represented as respective fingerprints, i.e., a list or one-dimensional vector of numbers. In particular, in the examples described above each compound is represented as a list of binary numbers, where a one or zero at each entry of the list indicates the presence or absence of a specific structural feature (fragment) in the respective compound. In an example in which different types of interaction is the molecular property of the population under consideration, this information can similarly be represented in fingerprint form on an individual compound basis—as will be described below—so as to allow application of the coverage score metric in a corresponding manner to the examples relating to compound structural features described above.

In order to analyze the different types of interaction in a population using the coverage score approach of the present disclosure, interaction data indicative of the different types of interaction exhibited by the different compounds in the population needs to first be obtained. One approach for obtaining such data includes application of a molecular docking process. Docking is a method of predicting the conformation of a ligand in the binding site of a target, with the aim of providing accurate modelling of the ligand arrangement in the binding pocket. Expressed differently, docking provides a prediction of a preferred orientation and conformation of a compound or molecule relative to another (target) molecule when they are bound to each other to form a stable complex. Docking may therefore be regarded as an optimization problem to describe a 'best-fit' for a ligand that binds to a particular target protein, where both the ligand and protein are flexible. In some cases, some or all of the interaction data may be obtained differently. For instance, interaction data for certain compounds may be available from experimental results or other sources.

In order to perform docking, a three-dimensional representation or description of the target may be generated for simulating how different compounds in the population may be accommodated in a binding pocket of the target. For each compound in the population, a number of docking poses may be generated, which each correspond to a snapshot of an orientation and conformation of a ligand-protein pair. The poses may be scored to determine a likelihood of whether particular poses represent favorable binding interactions. Different methods for generating and scoring docking poses as part of a docking process are known in the art. The docked compounds may have three-dimensional coordinates in the receptor's frame of reference.

Three-dimensional binding interaction information of different ligand-protein complexes may therefore be obtained from a docking process. This three-dimensional information may then be converted into a one-dimensional binary string, i.e., fingerprint, to allow the coverage score method to be applied. These fingerprints may be referred to as interaction fingerprints, or protein-ligand interaction fingerprints (PLIFs). In a corresponding manner to the molecular fingerprints described above, each bit of the interaction fingerprint may represent the presence or absence of a specific binding interaction when the associated compound binds with a predetermined target molecule of interest in the particular drug discovery project being undertaken. The target molecule, e.g., a protein, may be a molecule in a body that is identified as being intrinsically associated with a particular disease of interest and which could be targeted by a drug, e.g., a compound from the population, to produce a therapeutic effect. Interaction fingerprints are therefore a way of describing the interactions a given compound has with a receptor in terms of interaction made and with what residues.

The interaction fingerprint can be defined to include a desired number and combination of specific interactions that may be exhibited when compounds in the population bind to the predetermined target molecule. The specific interactions included in the fingerprint may include one or more of: an H-bond interaction; a weak H-bond interaction; an ionic interaction; a hydrophobic interaction; a face-to-face aromatic interaction; an edge-to-face aromatic interaction; a π-cation interaction; and a metal complexation interaction.

Once an interaction fingerprint has been generated, a coverage score selection can be used in a corresponding manner to the approach described above for structural features to select a number of compounds from a population with a diverse set of interactions, i.e., diverse set of fingerprints. Note that calculations of a 'feature score' in the above-described examples may be referred to as an 'interaction' score in the present example (and, in general, may be referred to as a molecular property score).

Figure 7A:
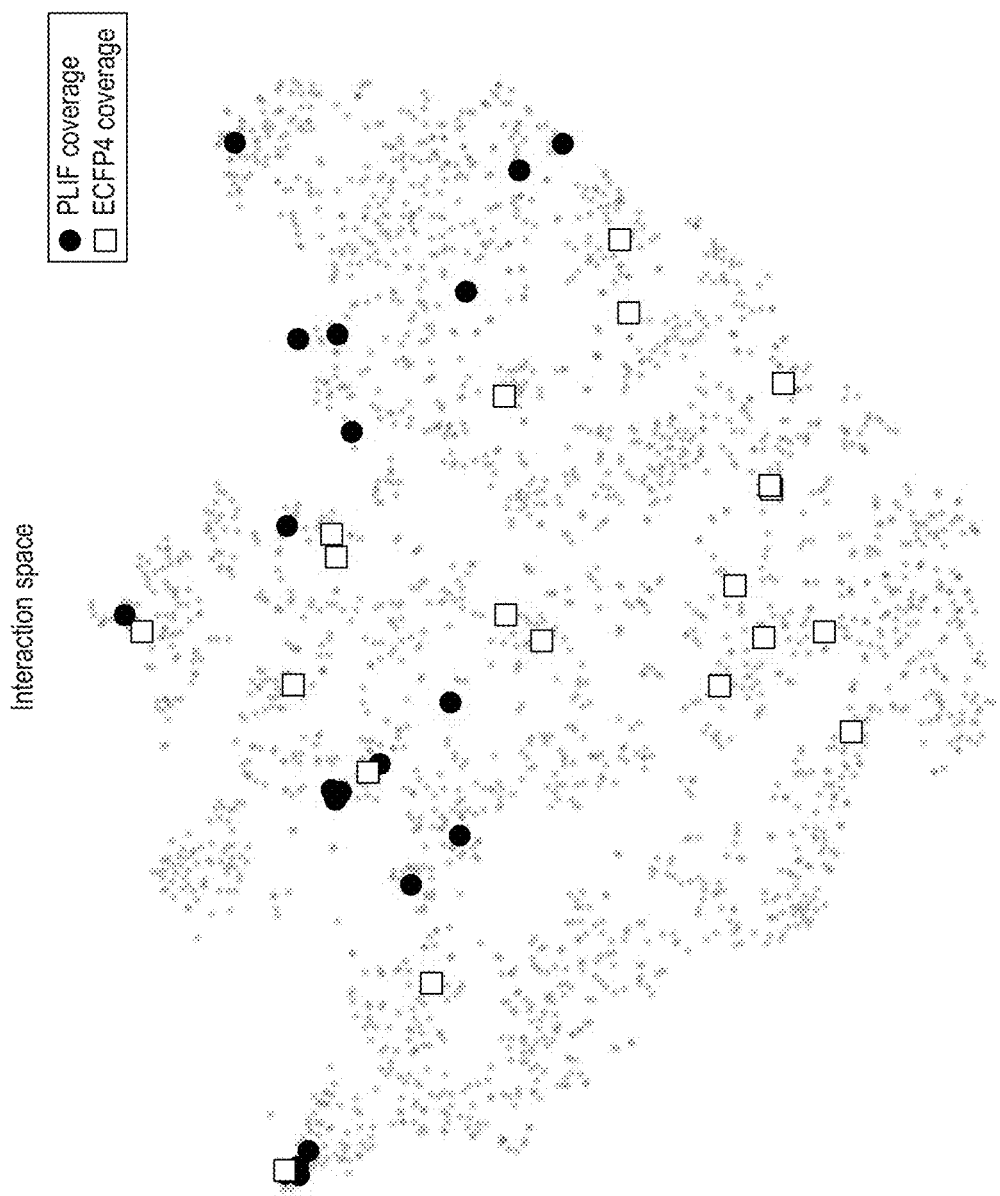
FIGS. 7(a) and 7(b) illustrate a selection of a subset of compounds from a population of compounds in chemical interaction space ('interaction space') and chemical structure space ('chemical space'), respectively, the selections being made in accordance with examples of the method of FIG. 6.
Figure 7B:
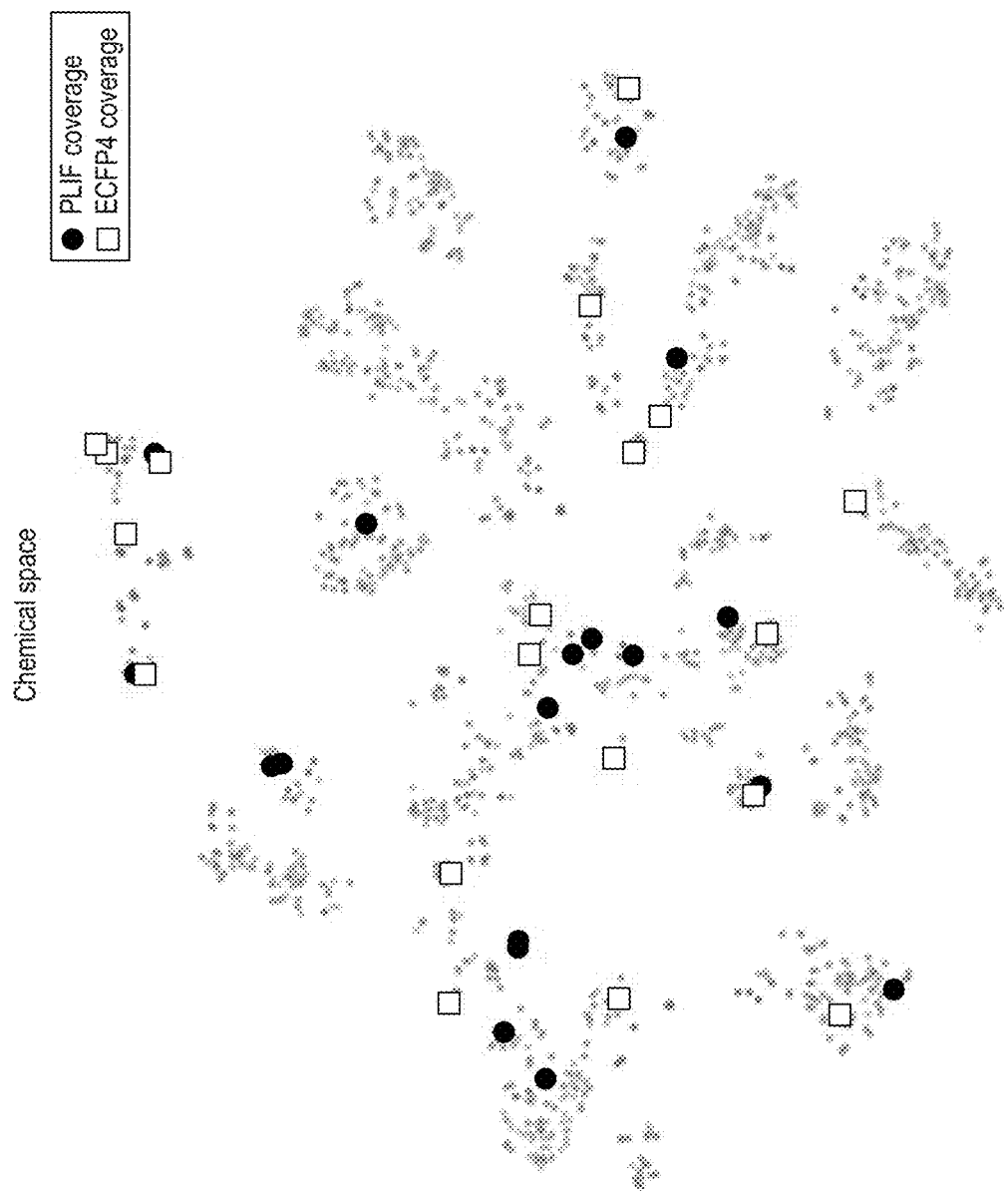

FIGS. 7(a) and 7(b) illustrate an example of the different compounds in a population that are selected when a coverage score approach to structural features and to types of interaction in the population. In particular, FIGS. 7(a) and 7(b) illustrate an example in which a subset of 20 compounds is selected using coverage score from a population of 2258 compounds. FIG. 7(a) illustrates the population of compounds, as well as the two selected subsets (one based on PLIFs and one based on ECFP4 fingerprints), in interaction space. FIG. 7(b) illustrates the same population and selected subsets as in FIG. 7(a), but in chemical structure space. The subsets were selected according to an iterative approach of coverage score until a stop condition was satisfied.

Figure 8A:
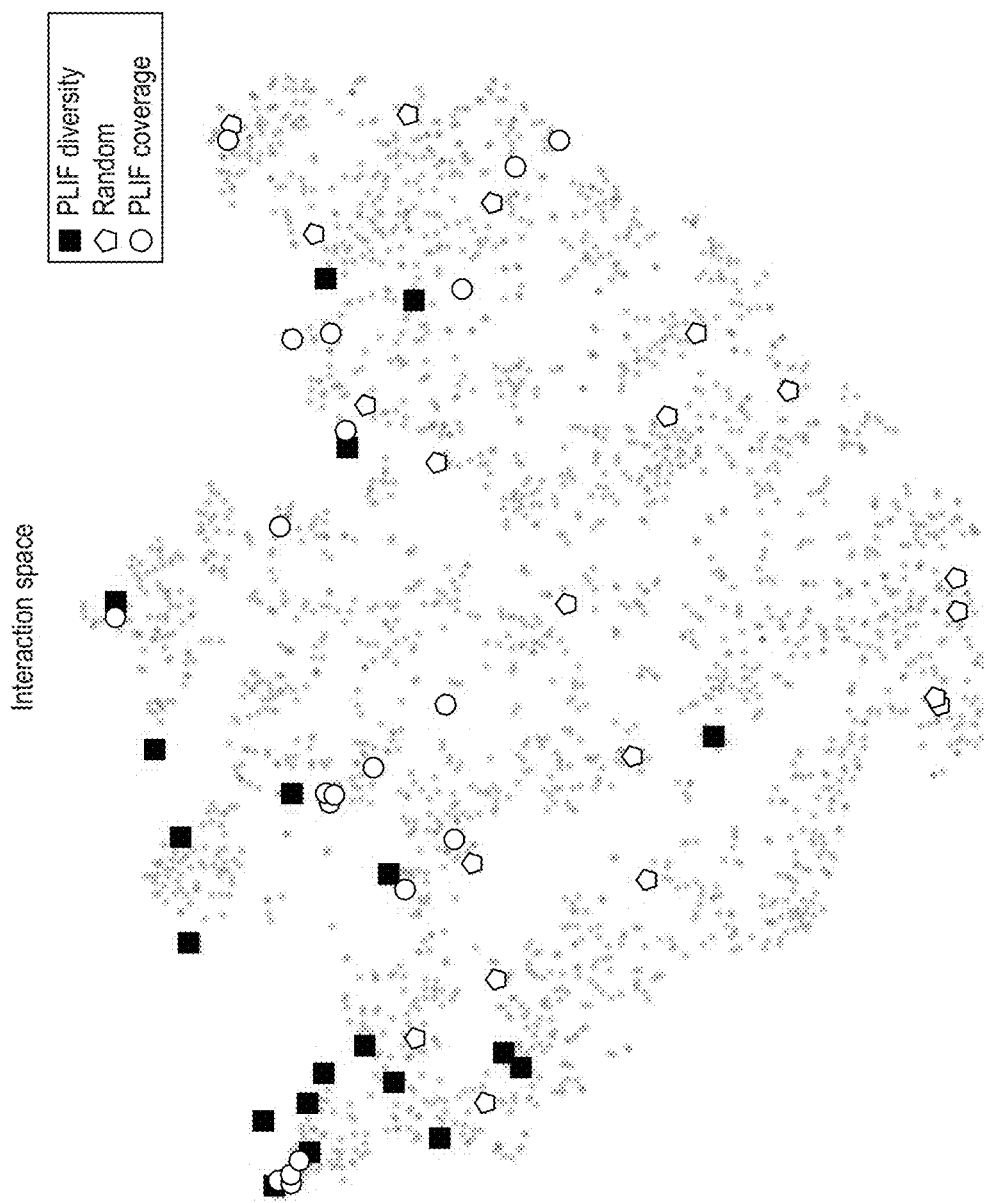
FIGS. 8(a) and 8(b) illustrate one of the subset selections from FIGS. 7(a) and 7(b), against subset selections according to previous methods, in chemical interaction space ('interaction space') and chemical structure space ('chemical space'), respectively.
Figure 8B:
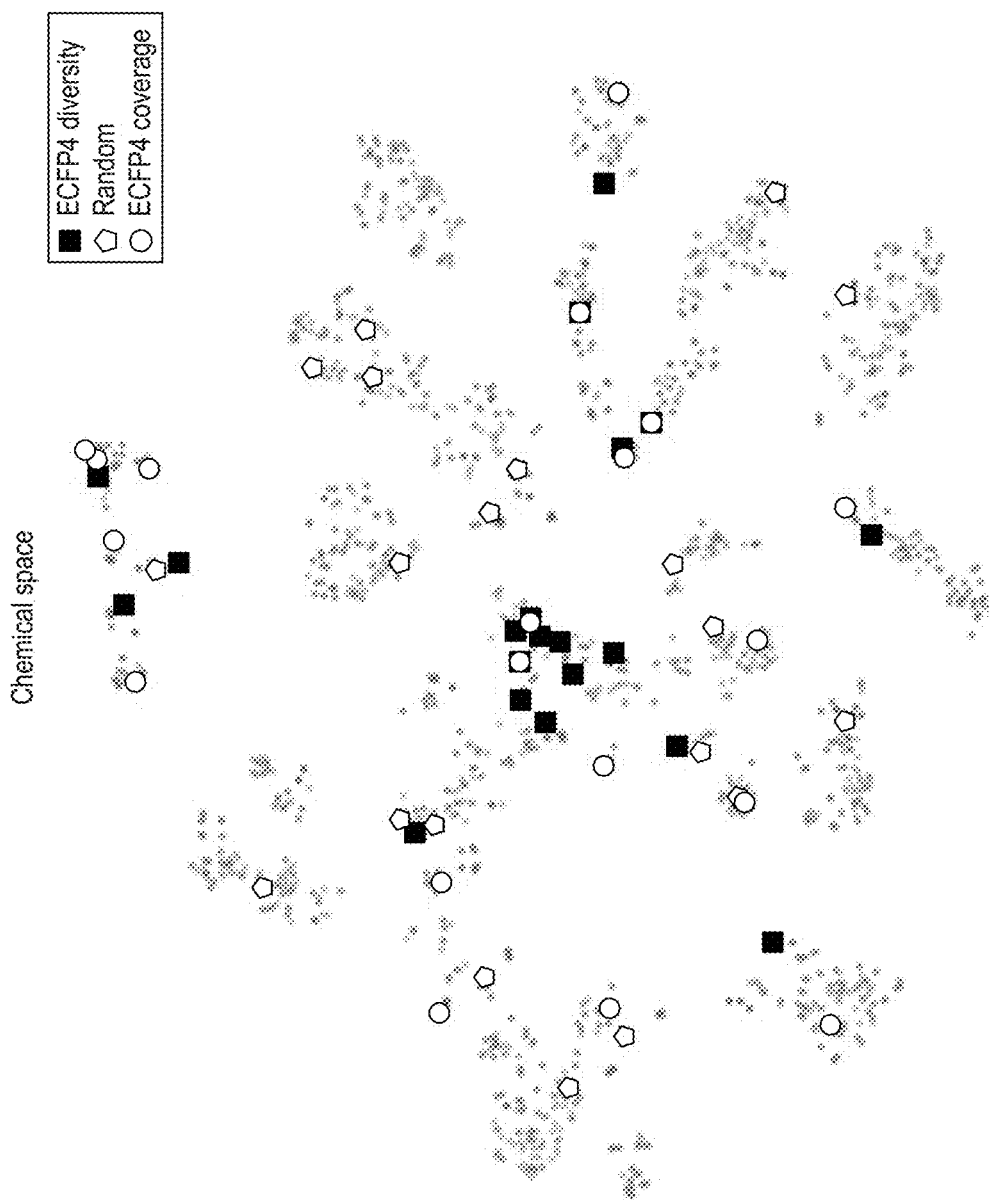

FIGS. 8(a) and 8(b) illustrate the same example of a coverage score selected subset when applied to PLIFs as in FIGS. 7(a) and 7(b), plotted in interaction space and chemical structure space, respectively. Unlike in FIGS. 7(a) and 7(b), in FIGS. 8(a) and 8(b) the PLIF coverage score selection is compared against a randomly selected subset from the population, and against an alternative selection method applied to PLIFs, namely a diversity selection method.

Three-dimensional descriptions of compounds other than the one described above may alternatively or additionally be used to generate fingerprints to which a coverage score selection may be applied. For instance, compounds may be described as a three-dimensional pharmacophore or three-dimensional shape, converted to a fingerprint.

In accordance with the invention, the steps of the computer-implemented method illustrated in FIG. 6 may therefore be generalized to be applicable to analysis of different molecular properties present in a defined population of compounds. Each compound in the population has one or more molecular properties associated therewith. As described above, these can include structural features, types of interaction exhibited when the respective compound binds to a predetermined target molecule, or other suitable molecular properties. In a case in which types of interaction are considered, this information may need to be obtained by performing a molecular docking process as described above to obtain predicted binding interactions of respective compounds when they interact with a predetermined target molecule. Irrespective of the particular molecular properties under consideration, a training set of compounds is defined comprising compounds whose biological properties are known, and a subset of compounds not in the training set is selected from the population. A coverage score of the selected subset is then determined in dependence on the particular molecular properties under consideration of the compounds in the selected subset, and the selected subset is evaluated based on the determined subset score. The subset score is determined in dependence on a frequency of each molecular property under consideration in the population and on a frequency of each molecular property under consideration in a sampled set comprising the training set and the selected subset.

It is noted that a fingerprint for a particular compound may be defined to include information about more than one molecular property of the compound. For instance, a first set of bits of the fingerprint may relate to structural features present in the compound and a subsequent set of bits after the first set may relate to types of interaction exhibited by the compound when it binds to a predetermined target molecule. A coverage score selection may be based on some or all of the information included in the fingerprint representations of the compounds in a population.

Further aspects and embodiments of the disclosure are set out in the following clauses.

Clause 1. A method for computational drug design, comprising:
defining a population of a plurality of compounds, each compound having one or more molecular properties;
defining a training set of compounds from the population for which one or more biological properties are known;
selecting a subset of one or more compounds from the population which are not in the training set; and,
determining a subset score of the selected subset in dependence on molecular properties of the one or more compounds in the selected subset, and evaluating the selected subset based on the determined subset score,
wherein the subset score is determined in dependence on a frequency of said molecular properties in the population and on a frequency of said molecular properties in a sampled set comprising the training set and the selected subset.

Clause 2. A method according to Clause 1, wherein the determination step comprises determining a compound score for each of the one or more compounds of the selected subset in dependence on one or more molecular properties of said compound, and wherein the subset score is determined based on the determined compound score of each compound in the selected subset.

Clause 3. A method according to Clause 2, wherein the subset score is determined to be a sum of the respective compound scores of the compounds in the selected sub set.

Clause 4. A method according to Clause 2 or Clause 3, wherein determining the compound score of one of the compounds in the selected subset comprises determining a molecular property score of each of the one or more molecular properties of the compound in dependence on the frequency of the respective molecular property in the population and on the frequency of the respective molecular property in the sampled set, the compound score of said compound being based on the determined scores of the one or more molecular properties of said compound.

Clause 5. A method according to Clause 4, wherein the compound score of said compound is determined to be a sum of the determined molecular property scores of the one or more molecular properties of said compound.

Clause 6. A method according to Clause 4 or Clause 5, wherein the molecular property score of each of the one or more molecular properties is determined in dependence on a normalized probability of said molecular property being in the sampled set, the normalized probability being determined in dependence on the frequency of said molecular property in the population and in the sampled set.

Clause 7. A method according to Clause 6, wherein the normalized probability is determined in dependence on a number of compounds in the sampled set relative to a number of compounds in the population.

Clause 8. A method according to Clause 7, wherein the normalized probability is a Laplacian corrected normalized probability.

Clause 9. A method according to Clause 8, wherein the Laplacian corrected normalized probability $P_{corr}$ is given by $$P_{corr} = \frac{F_{sampled} + 1}{F_{set} + 1/P_{base}}$$

where $F_{sampled}$ is the frequency of said molecular property in the sampled set, $F_{set}$ is the frequency of said molecular property in the population, and $P_{base}$ is the number of compounds in the sampled set divided by the number of compounds in the population.

Clause 10. A method according to any of Clauses 4 to 9, wherein the molecular property score of each of the one or more molecular properties is determined in dependence on a number of compounds in the sampled set in which said molecular property is present relative to a number of compounds in the sampled set.

Clause 11. A method according to Clause 10, wherein the molecular property score is determined in dependence on a normalized Shannon entropy value of said molecular property in the sampled set.

Clause 12. A method according to Clause 11, wherein the normalized Shannon entropy value is given by $$SC = \frac{-f\ln(f) - (1-f)\ln(1-f)}{\ln(2)}$$

where f is the number of compounds in the sampled set in which said molecular property is present divided by the number of compounds in the sampled set.

Clause 13. A method according to Clause 12, wherein the molecular property score $Cov_{final}$ is given by $$Cov_{final} = \begin{cases} Cov * SC, & Cov \geq 0 \\ Cov * (2 - SC), & Cov < 0 \text{ and } f > 0.5 \end{cases}$$

where $$Cov = -\ln(P_{corr}/P_{base})$$

Clause 14. A method according to any previous clause, wherein the subset includes a prescribed number of compounds.

Clause 15. A method according to Clause 14, wherein the method comprises defining the number of compounds to be selected in the subset.

Clause 16. A method according to any previous clause, wherein the evaluation step comprises determining whether the subset score satisfies a prescribed condition.

Clause 17. A method according to Clause 16, wherein the prescribed condition is that the subset score is greater than a prescribed minimum threshold score.

Clause 18. A method according to Clause 16 or Clause 17, wherein if the prescribed condition is satisfied, then the method comprises synthesizing at least some of the compounds in the selected subset to determine one or more biological properties of said compounds.

Clause 19. A method according to Clause 18, comprising adding the synthesized compounds to the training set.

Clause 20. A method according to any previous clause, wherein the selected subset is an initial selected subset, and the method comprises:

selecting a second subset, different from the initial selected subset, including one or more compounds from the population not in the training set; and, determining the subset score of the selected second subset, and evaluating the selected second subset based on the determined score.

Clause 21. A method according to Clause 20 when dependent on Clause 16, wherein the steps of selecting the second subset and determining its score are performed if the prescribed condition is not satisfied.

Clause 22. A method according to Clause 20 or Clause 21, wherein selecting the second subset comprises substituting one or more compounds in the initial selected subset with one or more new compounds from the population that are not in the training set.

Clause 23. A method according to Clause 22 when dependent on Clause 2, comprising identifying the one or more compounds from the initial selected subset to be substituted based on the respective determined compound scores of the one or more compounds in the initial selected subset.

Clause 24. A method according to Clause 23, wherein the one or more compounds in the initial selected subset having the lowest determined compound scores are identified for substitution.

Clause 25. A method according to any of Clauses 20 to 24, comprising iteratively performing the steps of:

selecting a new subset, different from a subset selected in a previous iteration, including one or more compounds from the population which are not in the training set; and, determining the subset score of the selected new subset, and evaluating the selected new subset based on the determined score, until a stop condition is satisfied.

Clause 26. A method according to Clause 25, wherein the stop condition includes at least one of: a maximum number of iterations have been performed; the subset score of the subset selected at one of the iterations satisfies the prescribed condition; and the difference between the respective subset scores of the selected subsets at successive iterations is less than a prescribed difference threshold.

Clause 27. A method according to Clause 25 or Clause 26, comprising synthesizing the compounds of the selected subset at the iteration at which the stop condition is satisfied to determine one or more biological properties of said compounds.

Clause 28. A method according to any of Clauses 24 to 27, comprising selecting a plurality of new subsets at each iteration, identifying one of the plurality of selected subsets at the iteration at which the stop condition is satisfied based on the determined subset scores of the respective plurality of selected subsets, and synthesizing the compounds of said one identified subset to determine one or more biological properties of said compounds.

Clause 29. A method according to Clause 28, wherein the identified subset is the subset having the highest subset score in the plurality of subsets at the iteration at which the stop condition is satisfied.

Clause 30. A method according to any previous clause, wherein the selected subset is a first subset, and the method comprising: selecting a plurality of subsets each including a plurality of compounds from the population which are not in the training set; determining the subset score of each of the subsets; and selecting the first subset from the plurality of subsets based on the determined subset scores of the respective subsets.

Clause 31. A method according to Clause 30, wherein the first subset is selected to be the subset having the highest subset score in the plurality of subsets.

Clause 32. A method according to Clause 30 or Clause 31, wherein the plurality of subsets each have the same number of compounds.

Clause 33. A method according to any previous clause, wherein the evaluation step comprises evaluating the selected subset based on an activity score of the selected subset obtained from an activity model for predicting activity levels of the compounds in the population.

Clause 34. A method according to Clause 33, wherein the evaluation step comprises evaluating the selected subset based on the determined subset score and the activity score relative to a desired balance of said scores.

Clause 35. A method according to Clause 33 or Clause 34 when dependent on Clause 28, wherein the plurality of new subsets each comprise a different balance between the determined score and the activity score.

Clause 36. A method according to Clause 35, wherein the plurality of new subsets form a Pareto front of determined subset and activity scores at the iteration at which the stop condition is satisfied.

Clause 37. A method according to any previous clause, wherein the training set is initially empty.

Clause 38. A method according to any previous clause, wherein the molecular properties of each of the plurality of compounds in the population include structural features of the compounds.

Clause 39. A method according to any previous clause, wherein the structural features of each of the plurality of compounds in the population correspond to fragments present in said compound.

Clause 40. A method according to Clause 39, wherein the fragments present in each of the plurality of compounds are represented as a molecular fingerprint.

Clause 41. A method according to Clause 40, wherein the molecular fingerprint is an Extended Connectivity Fingerprint (ECFP), optionally ECFP0, ECFP2, ECFP4, ECFP6, ECFP8, ECFP10 or ECFP12.

Clause 42a. A method according to any previous clause, wherein the molecular properties of each of the plurality of compounds in the population include chemical properties of the compounds.

Clause 42b. A method according to any previous clause, wherein the molecular properties of each of the plurality of compounds in the population include structural features and chemical properties of the compounds.

Clause 43. A method according to Clause 42a or Clause 42b, wherein the chemical properties correspond to types of interaction exhibited when the respective compound binds to a predetermined target molecule.

Clause 44. A method according to Clause 43, wherein the chemical properties of at least some of the compounds in the population correspond to a prediction of the types of interaction exhibited when the respective compound binds to the predetermined target molecule.

Clause 45. A method according to Clause 44, wherein the prediction comprises a prediction of which of one or more predetermined types of interaction is exhibited when the respective compound binds to the predetermined target molecule.

Clause 46. A method according to Clause 44 or Clause 45, comprising obtaining the prediction of the types of interaction exhibited when the respective compound binds to the predetermined target molecule.

Clause 47. A method according to Clause 46, wherein obtaining the prediction for each compound comprises:
generating a three-dimensional representation of said compound; and,
performing a docking process, using the generated three-dimensional representation, to predict a preferred docking pose when said compound binds to the predetermined target molecule,
wherein the exhibited types of interaction are predicted based on a result of the docking process.

Clause 48. A method according to any of Clauses 43 to 47, wherein the types of interaction exhibited when the respective compound binds to the predetermined target molecule are represented as an interaction fingerprint; optionally, as a protein-ligand interaction fingerprint (PLIF).

Clause 49. A method according to any of Clauses 43 to 48, wherein the types of interaction include one or more of: an H-bond interaction; a weak H-bond interaction; an ionic interaction; a hydrophobic interaction; a face-to-face aromatic interaction; an edge-to-face aromatic interaction; a π-cation interaction; and a metal complexation interaction.

Clause 50. A method according to any of Clauses 43 to 49, wherein each of the compounds in the population are ligands and the predetermined target molecule is a protein.

Clause 51. A method according to any previous clause, wherein the one or more biological properties includes one or more of: activity; selectivity; toxicity; absorption; distribution; metabolism; and excretion.

Clause 52. A method according to any previous clause, wherein one or more of the biological properties are defined relative to respective desired biological properties.

Clause 53. A method according to any previous clause, comprising:
defining a machine learning model for approximating one or more biological properties of compounds in the population as a function of the one or more molecular properties of said compounds; and, training the machine learning model using the training set of compounds.

Clause 54. A method according to Clause 53, wherein the method comprises performing the training step each time one or more compounds are added to the training set.

Clause 55. A method according to Clause 53 or Clause 54, wherein the machine learning model is at least one of: a Bayesian optimization model; a regression model; a clustering model; a decision tree model; a random forest model; and a neural network model.

Clause 56. A method according to any of Clauses 53 to 55, comprising executing the machine learning model, after the training step, to predict one or more compounds in the population having one or more desired biological properties.

Clause 57. A method according to Clause 56, further comprising synthesizing at least one of the one or more predicted compounds.

Clause 58. A method according to Clause 56 or Clause 57, wherein the one or more predicted compound is a candidate drug or therapeutic molecule having a desired biological, biochemical, physiological and/or pharmacological activity against a predetermined target molecule.

Clause 59. A method according to Clause 58, wherein the predetermined target molecule is an in vitro and/or in vivo therapeutic, diagnostic or experimental assay target.

Clause 60. A method according to Clause 58 or Clause 59, wherein the candidate drug or therapeutic molecule is for use in medicine; for example, in a method for the treatment of an animal, such as a human or non-human animal.

Clause 61. A compound identified by the method of any previous clause.

Clause 62. A non-transitory, computer-readable storage medium storing instructions thereon that when executed by a computer processor causes the computer processor to perform the method of any of Clauses 1 to 60.

Clause 63. A computing device for computational drug design, comprising:
an input arranged to receive data indicative of a population of a plurality of compounds, each compound having one or more molecular properties, and to receive data indicative of a training set of compounds from the population for which one or more biological properties are known;
a processor arranged to select a subset of one or more compounds from the population which are not in the training set, to determine a subset score of the selected subset in dependence on molecular properties of the one or more compounds in the selected subset, and to evaluate the selected subset based on the determined subset score; and,
an output arranged to output a result of the evaluation,
wherein the subset score is determined in dependence on a frequency of said molecular properties in the population and on a frequency of said molecular properties in a sampled set comprising the training set and the selected subset.

Clause 64. A computing device according to Clause 63, wherein the processor is configured to perform a method according to any of Clauses 1 to 60.

Clause 65. A computer-implemented method for drug design, comprising:
defining a population of a plurality of compounds;
obtaining, for each of the plurality of compounds, interaction data indicative of types of interaction exhibited when the respective compound binds to a predetermined target molecule;
defining a training set of compounds from the population for which one or more biological properties are known;
selecting a subset of one or more compounds from the population which are not in the training set; and,
determining a subset score of the selected subset in dependence on the obtained interaction data of the one or more compounds in the selected subset, and evaluating the selected subset based on the determined subset score,
wherein the subset score is determined in dependence on a frequency of said types of interaction in the population and on a frequency of said types of interaction in a sampled set comprising the training set and the selected subset.

Clause 66. A method according to Clause 65, wherein the obtained interaction data for at least some of the plurality of compounds in the population is data indicative of a prediction of the types of interaction exhibited when the respective compound binds to the predetermined target molecule.

Clause 67. A method according to Clause 66, wherein the prediction comprises a prediction of which of one or more predetermined types of interaction is exhibited when the respective compound binds to the predetermined target molecule.

Clause 68. A method according to Clause 66 or Clause 67, comprising obtaining the prediction of the types of interaction exhibited when the respective compound binds to the predetermined target molecule.

Clause 69. A method according to Clause 68, wherein obtaining the prediction for each compound comprises:
generating a three-dimensional representation of said compound; and,
performing a docking process, using the generated three-dimensional representation, to predict a preferred docking pose when said compound binds to the predetermined target molecule,
wherein the exhibited types of interaction are predicted based on a result of the docking process.

Clause 70. A method according to any of Clauses 65 to 69, wherein the types of interaction exhibited when the respective compound binds to the predetermined target molecule are represented as an interaction fingerprint; optionally, as a protein-ligand interaction fingerprint (PLIF).

Clause 71. A method according to any of Clauses 65 to 70, wherein the types of interaction include one or more of: an H-bond interaction; a weak H-bond interaction; an ionic interaction; a hydrophobic interaction; a face-to-face aromatic interaction; an edge-to-face aromatic interaction; a π-cation interaction; and a metal complexation interaction.

Clause 72. A method according to any of Clauses 65 to 71, wherein each of the compounds in the population are ligands and the predetermined target molecule is a protein.

Clause 73. A method according to any of Clauses 65 to 72, wherein the determination step comprises determining a compound score for each of the one or more compounds of the selected subset in dependence on one or more types of interaction in the interaction data of said compound, and wherein the subset score is determined based on the determined compound score of each compound in the selected subset.

Clause 74. A method according to Clause 73, wherein the subset score is determined to be a sum of the respective compound scores of the compounds in the selected sub set.

Clause 75. A method according to Clause 73 or Clause 74, wherein determining the compound score of one of the compounds in the selected subset comprises determining an interaction score of each of the one or more types of interaction in the interaction data of the compound in dependence on the frequency of the respective type of interaction in the population and on the frequency of the respective type of interaction in the sampled set, the compound score of said compound being based on the determined scores of the one or more types of interaction in the interaction data of said compound.

Clause 76. A method according to Clause 75, wherein the compound score of said compound is determined to be a sum of the determined interaction scores of the one or more types of interaction in the interaction data of said compound.

Clause 77 A method according to Clause 75 or Clause 76, wherein the interaction score of each of the one or more types of interaction in the interaction data is determined in dependence on a normalized probability of said type of interaction being in the sampled set, the normalized probability being determined in dependence on the frequency of said type of interaction in the population and in the sampled set.

Clause 78. A method according to Clause 77, wherein the normalized probability is determined in dependence on a number of compounds in the sampled set relative to a number of compounds in the population.

Clause 79. A method according to Clause 78, wherein the normalized probability is a Laplacian corrected normalized probability.

Clause 80. A method according to Clause 79, wherein the Laplacian corrected normalized probability $P_{corr}$ is given by $$P_{corr} = \frac{F_{sampled} + 1}{F_{set} + 1/P_{base}}$$

where $F_{sampled}$ is the frequency of said type of interaction in the sampled set, $F_{set}$ is the frequency of said type of interaction in the population, and $P_{base}$ is the number of compounds in the sampled set divided by the number of compounds in the population.

Clause 81. A method according to any of Clauses 75 to 80, wherein the interaction score of each of the one or more types of interaction in the interaction data is determined in dependence on a number of compounds in the sampled set in which said type of interaction is present relative to a number of compounds in the sampled set.

Clause 82. A method according to Clause 81, wherein the interaction score is determined in dependence on a normalized Shannon entropy value of said type of interaction in the sampled set.

Clause 83. A method according to Clause 82, wherein the normalized Shannon entropy value is given by $$SC = \frac{-f\ln(f) - (1-f)\ln(1-f)}{\ln(2)}$$

where f is the number of compounds in the sampled set in which said molecular property is present divided by the number of compounds in the sampled set.

Clause 84. A method according to Clause 83, wherein the interaction score $Cov_{final}$ is given by $$Cov_{final} = \begin{cases} Cov * SC, & Cov \geq 0 \\ Cov * (2 - SC), & Cov < 0 \text{ and } f > 0.5 \end{cases}$$

where $$Cov = -\ln(P_{corr}/P_{base})$$

Clause 85. A method according to any of Clauses 65 to 84, wherein the subset includes a prescribed number of compounds.

Clause 86. A method according to Clause 85, wherein the method comprises defining the number of compounds to be selected in the subset.

Clause 87. A method according to any of Clauses 65 to 86, wherein the evaluation step comprises determining whether the subset score satisfies a prescribed condition.

Clause 88. A method according to Clause 87, wherein the prescribed condition is that the subset score is greater than a prescribed minimum threshold score.

Clause 89. A method according to Clause 87 or Clause 88, wherein if the prescribed condition is satisfied, then the method comprises synthesizing at least some of the compounds in the selected subset to determine one or more biological properties of said compounds.

Clause 90. A method according to Clause 89, comprising adding the synthesized compounds to the training set.

Clause 91. A method according to any of Clauses 65 to 90, wherein the selected subset is an initial selected subset, and the method comprises:

selecting a second subset, different from the initial selected subset, including one or more compounds from the population not in the training set; and, determining the subset score of the selected second subset, and evaluating the selected second subset based on the determined score.

Clause 92. A method according to Clause 91 when dependent on Clause 87, wherein the steps of selecting the second subset and determining its score are performed if the prescribed condition is not satisfied.

Clause 93. A method according to Clause 91 or Clause 92, wherein selecting the second subset comprises substituting one or more compounds in the initial selected subset with one or more new compounds from the population that are not in the training set.

Clause 94. A method according to Clause 93 when dependent on Clause 73, comprising identifying the one or more compounds from the initial selected subset to be substituted based on the respective determined compound scores of the one or more compounds in the initial selected subset.

Clause 95. A method according to Clause 94, wherein the one or more compounds in the initial selected subset having the lowest determined compound scores are identified for substitution.

Clause 96. A method according to any of Clauses 91 to 95, comprising iteratively performing the steps of:

selecting a new subset, different from a subset selected in a previous iteration, including one or more compounds from the population which are not in the training set; and, determining the subset score of the selected new subset, and evaluating the selected new subset based on the determined score, until a stop condition is satisfied.

Clause 97. A method according to Clause 96, wherein the stop condition includes at least one of: a maximum number of iterations have been performed; the subset score of the subset selected at one of the iterations satisfies the prescribed condition; and the difference between the respective subset scores of the selected subsets at successive iterations is less than a prescribed difference threshold.

Clause 98. A method according to Clause 96 or Clause 97, comprising synthesizing the compounds of the selected subset at the iteration at which the stop condition is satisfied to determine one or more biological properties of said compounds.

Clause 99. A method according to any of Clauses 95 to 98, comprising selecting a plurality of new subsets at each iteration, identifying one of the plurality of selected subsets at the iteration at which the stop condition is satisfied based on the determined subset scores of the respective plurality of selected subsets, and synthesizing the compounds of said one identified subset to determine one or more biological properties of said compounds.

Clause 100. A method according to Clause 99, wherein the identified subset is the subset having the highest subset score in the plurality of subsets at the iteration at which the stop condition is satisfied.

Clause 101. A method according to any of Clauses 65 to 100, wherein the selected subset is a first subset, and the method comprising: selecting a plurality of subsets each including a plurality of compounds from the population which are not in the training set; determining the subset score of each of the subsets; and, selecting the first subset from the plurality of subsets based on the determined subset scores of the respective subsets.

Clause 102. A method according to Clause 101, wherein the first subset is selected to be the subset having the highest subset score in the plurality of subsets.

Clause 103. A method according to Clause 102 or Clause 103, wherein the plurality of subsets each have the same number of compounds.

Clause 104. A method according to any of Clauses 65 to 103, wherein the evaluation step comprises evaluating the selected subset based on an activity score of the selected subset obtained from an activity model for predicting activity levels of the compounds in the population.

Clause 105. A method according to Clause 104, wherein the evaluation step comprises evaluating the selected subset based on the determined subset score and the activity score relative to a desired balance of said scores.

Clause 106. A method according to Clause 104 or Clause 105 when dependent on Clause 101, wherein the plurality of new subsets each comprise a different balance between the determined score and the activity score.

Clause 107. A method according to Clause 106, wherein the plurality of new subsets form a Pareto front of determined subset and activity scores at the iteration at which the stop condition is satisfied.

Clause 108. A method according to any of Clauses 65 to 107, wherein the training set is initially empty.

Clause 109. A method according to any of Clauses 65 to 108, wherein the one or more biological properties includes one or more of: activity; selectivity; toxicity; absorption; distribution; metabolism; and excretion.

Clause 110. A method according to any of Clauses 65 to 109, wherein one or more of the biological properties are defined relative to respective desired biological properties.

Clause 111. A method according to any of Clauses 65 to 110, comprising:
defining a machine learning model for approximating one or more biological properties of compounds in the population as a function of the one or more types of interaction in the obtained interaction data of said compounds; and, training the machine learning model using the training set of compounds.

Clause 112. A method according to Clause 111, wherein the method comprises performing the training step each time one or more compounds are added to the training set.

Clause 113. A method according to Clause 111 or Clause 112, wherein the machine learning model is at least one of: a Bayesian optimization model; a regression model; a clustering model; a decision tree model; a random forest model; and a neural network model.

Clause 114. A method according to any of Clauses 111 to 113, comprising executing the machine learning model, after the training step, to predict one or more compounds in the population having one or more desired biological properties.

Clause 115. A method according to Clause 114, further comprising synthesizing at least one of the one or more predicted compounds.

Clause 116. A method according to Clause 114 or Clause 115, wherein the one or more predicted compound is a candidate drug or therapeutic molecule having a desired biological, biochemical, physiological and/or pharmacological activity against a predetermined target molecule.

Clause 117. A method according to Clause 116, wherein the predetermined target molecule is an in vitro and/or in vivo therapeutic, diagnostic, or experimental assay target.

Clause 118. A method according to Clause 117 or Clause 118, wherein the candidate drug or therapeutic molecule is for use in medicine; for example, in a method for the treatment of an animal, such as a human or non-human animal.

Clause 119. A compound identified by the method of any of Clauses 65 to 118.

Clause 120. A non-transitory, computer-readable storage medium storing instructions thereon that when executed by a computer processor causes the computer processor to perform the method of any of Clauses 65 to 118.

Clause 121. A computing device for computational drug design, comprising:
an input arranged to receive:
population data indicative of a population of a plurality of compounds;
interaction data, for each of the plurality of compounds, indicative of types of interaction exhibited when the respective compound binds to a predetermined target molecule; and,
training set data indicative of a training set of compounds from the population for which one or more biological properties are known;
a processor arranged to select a subset of one or more compounds from the population which are not in the training set, to determine a subset score of the selected subset in dependence on types of interaction in the interaction data of the one or more compounds in the selected subset, and to evaluate the selected subset based on the determined subset score; and,
an output arranged to output a result of the evaluation,
wherein the subset score is determined in dependence on a frequency of said types of interaction in the interaction data in the population and on a frequency of said types of interaction in the interaction data in a sampled set comprising the training set and the selected sub set.

Clause 122. A computing device according to Clause 121, wherein the processor is configured to perform a method according to any of Clauses 65 to 118.

What is claimed is:

1. A method for computational drug design, comprising:
defining a population of a plurality of compounds, each compound of the plurality of compounds having one or more molecular properties;
defining, from the population, a training set of compounds for which one or more biological properties are known;
selecting, from the population, a subset of one or more compounds that are not in the training set;
determining, for each compound in the selected subset, a compound score based on at least one molecular property of a compound, wherein determining the compound score comprises comparing a frequency of a molecular property in a sampled set comprising the training set and the selected subset to a frequency of the molecular property in the population;
determining a subset score of the selected subset based on the compound score of each compound in the selected subset;
generating, based on the determined subset score, an updated training set of compounds comprising the one or more compounds of the selected subset; and
training a machine learning model using the updated training set of compounds.

2. The method according to claim 1, further comprising determining, using the trained machine learning model, one or more compounds in the population that exhibit one or more biological properties relative to target criteria.

3. The method according to claim 2, wherein determining the compound score of one of the compounds in the selected subset comprises:
determining a molecular property score of each of the one or more molecular properties of the compound based on the frequency of the respective molecular property in the population and on the frequency of the respective molecular property in the sampled set, the compound score of the compound being based on the determined scores of the one or more molecular properties of the compound.

4. The method according to claim 3, wherein the molecular property score of each of the one or more molecular properties is determined based on a normalized probability of the molecular property being in the sampled set, the normalized probability being determined based on the frequency of the molecular property in the population and in the sampled set, wherein the normalized probability is determined based on a number of compounds in the sampled set relative to a number of compounds in the population.

5. The method according to claim 4, wherein the normalized probability is a Laplacian corrected normalized probability, $P_{corr}$, given by:

$$P_{corr} = \frac{F_{sampled} + 1}{F_{set} + 1/P_{base}}$$

wherein $F_{sampled}$ is the frequency of the molecular property in the sampled set, $F_{set}$ is the frequency of the molecular property in the population, and Phase is the number of compounds in the sampled set divided by the number of compounds in the population.

6. The method according to claim 4, wherein the molecular property score of each of the one or more molecular properties is determined based on a number of compounds in the sampled set in which the molecular property is present relative to a number of compounds in the sampled set.

7. The method according to claim 6, wherein the molecular property score is determined based on a normalized Shannon entropy value of the molecular property in the sampled set.

8. The method according to claim 7, wherein the normalized Shannon entropy value is given by:

$$SC = \frac{-f\ln(f) - (1-f)\ln(1-f)}{\ln(2)}$$

wherein f is the number of compounds in the sampled set in which the molecular property is present divided by the number of compounds in the sampled set.

9. The method according to claim 8, wherein the molecular property score $COV_{final}$ is given by $$Cov_{final} = \begin{cases} Cov * SC, & Cov \geq 0 \\ Cov * (2 - SC), & Cov < 0 \text{ and } f > 0.5 \end{cases},$$

wherein $Cov = -\ln(P_{corr}/P_{base})$.

10. The method according to claim 1, wherein evaluating the selected subset based on the determined subset score comprises determining whether the subset score satisfies a prescribed condition, wherein the prescribed condition is that the subset score is greater than a prescribed minimum threshold score.

11. The method according to claim 10, further comprising:
when the prescribed condition is satisfied, synthesizing at least some of the compounds in the selected subset to determine one or more biological properties of the compounds.

12. The method according to claim 11, further comprising: adding the synthesized compounds to the training set.

13. The method according to claim 1, wherein the selected subset is an initial selected subset, and the method further comprises:
selecting a second subset, different from the initial selected subset, the second subset including one or more compounds from the population not in the training set; and
determining the subset score of the selected second subset and evaluating the selected second subset based on the determined score.

14. The method according to claim 13, further comprising iteratively performing the steps of:
selecting a new subset, different from a subset selected in a previous iteration, including one or more compounds from the population that are not in the training set; and
determining the subset score of the selected new subset, and evaluating the selected new subset based on the determined score,
until a stop condition is satisfied.

15. The method according to claim 14, further comprising:
synthesizing the compounds of the selected subset at an iteration at which the stop condition is satisfied to determine one or more biological properties of the compounds.

16. The method according to claim 1, wherein evaluating the selected subset based on the determined subset score comprises:
evaluating the selected subset based on an activity score of the selected subset obtained from an activity model for predicting activity levels of the compounds in the population, including evaluating the selected subset based on the determined subset score and the activity score relative to a desired balance of the scores.

17. The method according to claim 1, further comprising:
defining a machine learning model for approximating one or more biological properties of compounds in the population as a function of the one or more molecular properties of the compounds; and,
training the machine learning model using the training set of compounds.

18. The method according to claim 17, further comprising:
performing the training step each time one or more compounds are added to the training set.

19. The method according to claim 17, further comprising:
executing the machine learning model, after the training step, to predict one or more compounds in the population having one or more desired biological properties; and
synthesizing at least one of the one or more predicted compounds.

20. A computing device for computational drug design, comprising:
an input component configured to receive data indicative of a population of a plurality of compounds, each compound having one or more molecular properties, and to receive data indicative of a training set of compounds from the population for which one or more biological properties are known;
a processor configured to:
select a subset of one or more compounds from the population that are not in the training set;

determine, for each compound in the selected subset, a compound score based on at least one molecular property of a compound, wherein determining the compound score comprises comparing a frequency of a molecular property in a sampled set comprising the training set and the selected subset to a frequency of the molecular property in the population;

determine a subset score of the selected subset based on the compound score of each compound in the selected subset;

generate, based on the determined subset score, an updated training set of compounds comprising the one or more compounds of the selected subset; and train a machine learning model using the updated training set of compounds.

* * * * *